United States Patent
Kim et al.

(10) Patent No.: US 10,791,584 B2
(45) Date of Patent: Sep. 29, 2020

(54) METHOD FOR TRANSMITTING AND RECEIVING DATA IN WIRELESS COMMUNICATION SYSTEM, AND APPARATUS THEREFOR

(71) Applicant: LG Electronics Inc., Seoul (KR)

(72) Inventors: Myoungseob Kim, Seoul (KR); Hanbyul Seo, Seoul (KR); Seungmin Lee, Seoul (KR); Hyukjin Chae, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/314,482

(22) PCT Filed: Jul. 3, 2017

(86) PCT No.: PCT/KR2017/007045
§ 371 (c)(1),
(2) Date: Dec. 31, 2018

(87) PCT Pub. No.: WO2018/004322
PCT Pub. Date: Jan. 4, 2018

(65) Prior Publication Data
US 2019/0254091 A1 Aug. 15, 2019

Related U.S. Application Data

(60) Provisional application No. 62/357,393, filed on Jul. 1, 2016.

(51) Int. Cl.
*H04W 76/14* (2018.01)
*H04W 72/12* (2009.01)
(Continued)

(52) U.S. Cl.
CPC .......... *H04W 76/14* (2018.02); *H04L 1/0003* (2013.01); *H04L 1/0009* (2013.01);
(Continued)

(58) Field of Classification Search
None
See application file for complete search history.

(56) References Cited

U.S. PATENT DOCUMENTS

2013/0322413 A1 12/2013 Pelletier et al.
2014/0050186 A1 2/2014 Kim et al.
(Continued)

FOREIGN PATENT DOCUMENTS

EP 2701442 A2 2/2014
WO 2015/122629 A1 8/2015
(Continued)

OTHER PUBLICATIONS

LG Electronics et al., "WF on DCI for SL SPS", R1-165728, 3GPP TSG RAN WG1 Meeting #85, May 30, 2016.
(Continued)

*Primary Examiner* — Gregory B Sefcheck
*Assistant Examiner* — Srinivasa R Reddivalam
(74) *Attorney, Agent, or Firm* — Dentons US LLP

(57) ABSTRACT

Disclosed are a method for transmitting and receiving data in a wireless communication system supporting vehicle-to-everything (V2X) communication, and an apparatus therefor. Specifically, a method for transmitting and receiving data by a first terminal in a wireless communication system supporting V2X comprises the steps of: receiving, from a base station, downlink control information (DCI) including resource allocation information related to the transmission of control information for a sidelink; transmitting, to a second terminal, the control information for the sidelink on the basis of the resource allocation information; and transmitting at least one type of data to the second terminal, wherein the control information for the sidelink can be transmitted in a second subframe positioned after a prede-
(Continued)

termined offset from a first subframe in which the downlink control information is received.

9 Claims, 19 Drawing Sheets

(51) Int. Cl.
| | | |
|---|---|---|
| *H04W 4/40* | (2018.01) | |
| *H04L 5/00* | (2006.01) | |
| *H04W 72/04* | (2009.01) | |
| *H04L 1/00* | (2006.01) | |

(52) U.S. Cl.
CPC .......... *H04L 5/0053* (2013.01); *H04L 5/0078* (2013.01); *H04W 4/40* (2018.02); *H04W 72/042* (2013.01); *H04W 72/0446* (2013.01); *H04W 72/12* (2013.01); *H04W 72/1289* (2013.01)

(56) References Cited

U.S. PATENT DOCUMENTS

| | | | |
|---|---|---|---|
| 2015/0215979 | A1 | 7/2015 | Nan et al. |
| 2015/0271840 | A1 | 9/2015 | Tavildar et al. |
| 2015/0327118 | A1 | 11/2015 | Yoon |
| 2016/0065332 | A1 | 3/2016 | Yum et al. |
| 2016/0073408 | A1 | 3/2016 | Sartori et al. |
| 2016/0345312 | A1 | 11/2016 | Kim et al. |
| 2017/0127413 | A1 | 5/2017 | Guan |
| 2017/0230996 | A1 | 8/2017 | Li et al. |
| 2017/0289733 | A1* | 10/2017 | Rajagopal ............... H04L 67/12 |
| 2017/0295601 | A1 | 10/2017 | Kim |
| 2018/0049260 | A1* | 2/2018 | Aminaka ............... H04W 76/14 |
| 2018/0098322 | A1 | 4/2018 | Yoon |
| 2018/0146494 | A1* | 5/2018 | Khoryaev ............... H04W 76/14 |
| 2018/0242317 | A1* | 8/2018 | Marinier ............... H04W 72/042 |
| 2019/0182827 | A1 | 6/2019 | Wang et al. |
| 2019/0191424 | A1 | 6/2019 | Wang et al. |
| 2019/0191452 | A1 | 6/2019 | Pelletier et al. |

FOREIGN PATENT DOCUMENTS

| | | | | |
|---|---|---|---|---|
| WO | WO-2015122629 A1 | * | 8/2015 | ............... H04L 5/00 |
| WO | 2015/152581 A1 | | 10/2015 | |

OTHER PUBLICATIONS

CMCC, "Discussion on SPS Configurations", R1-164878, 3GPP TSG RAN WG1 Meeting #85, May 13, 2016.

Huawei et al., "SPS Enhancement for V2V". R1-164818, 3GPP TSG RAN WG1 Meeting #85, May 14, 2016.

NEC, "Schedule Assignment for SPS", 3GPP TSG RAN WG1 Meeting #85, May 23-27, 2016, R1-164473.

LG Electronics, "Discussion on sidelink subframe riming and number determination", 3GPP TSG RAN WG1 Meeting #85, May 23-27, 2016, R1-164521.

CATT: "Discussion on eNB assistant resource allocation in PC5-based V2V", R1-162269, 3GPP TSG RAN WG1 Meeting #84bis, Busan, Korea, Apr. 11-15, 2016.

* cited by examiner

[FIG.1]
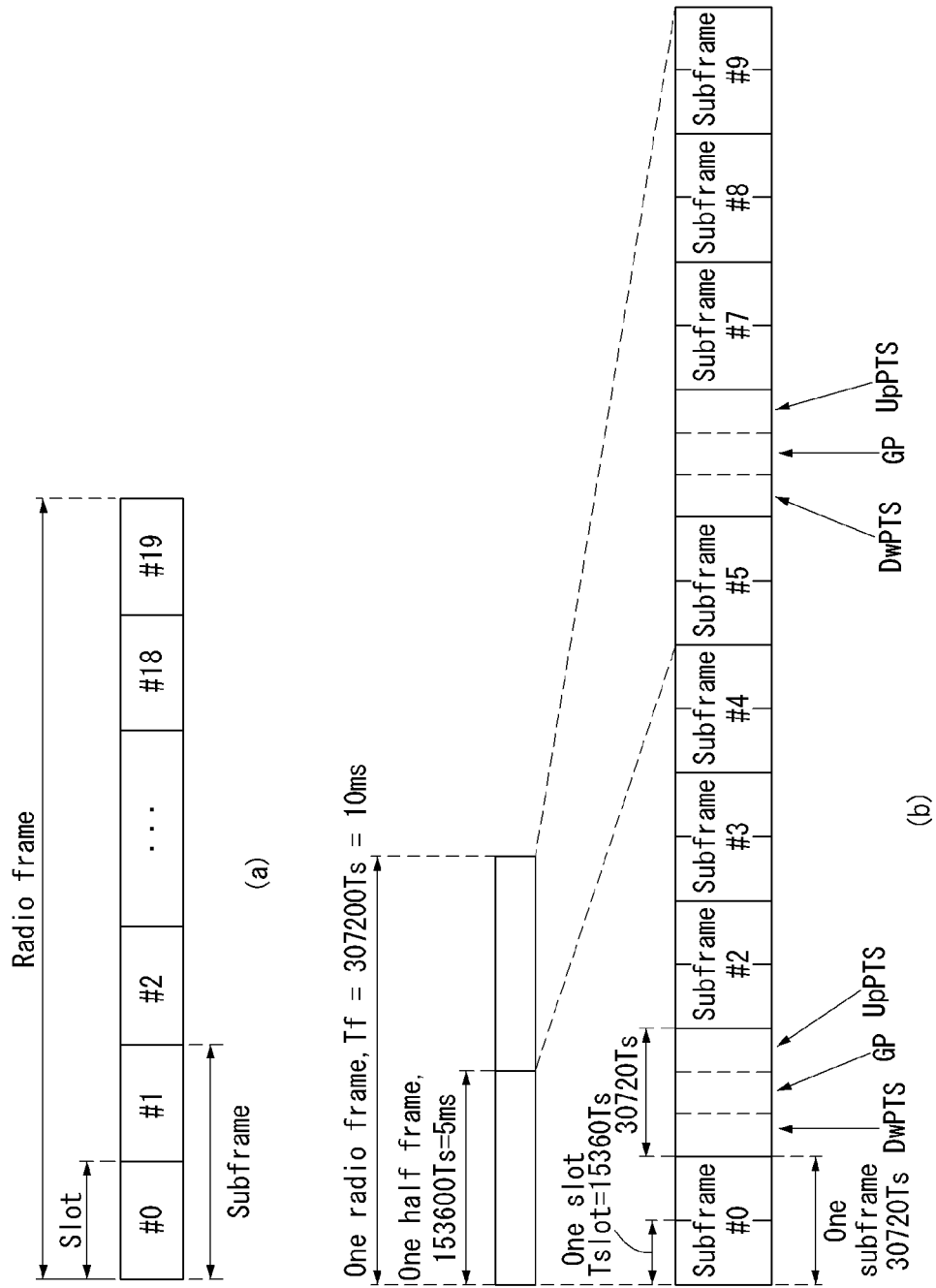

[FIG.2]
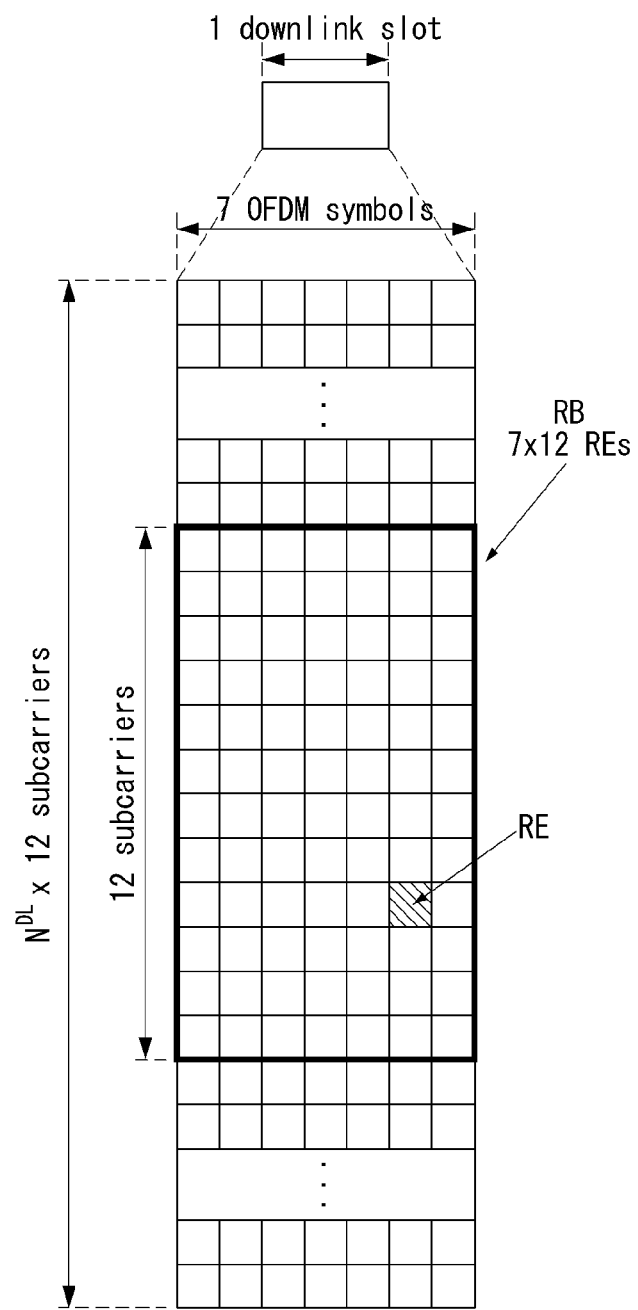

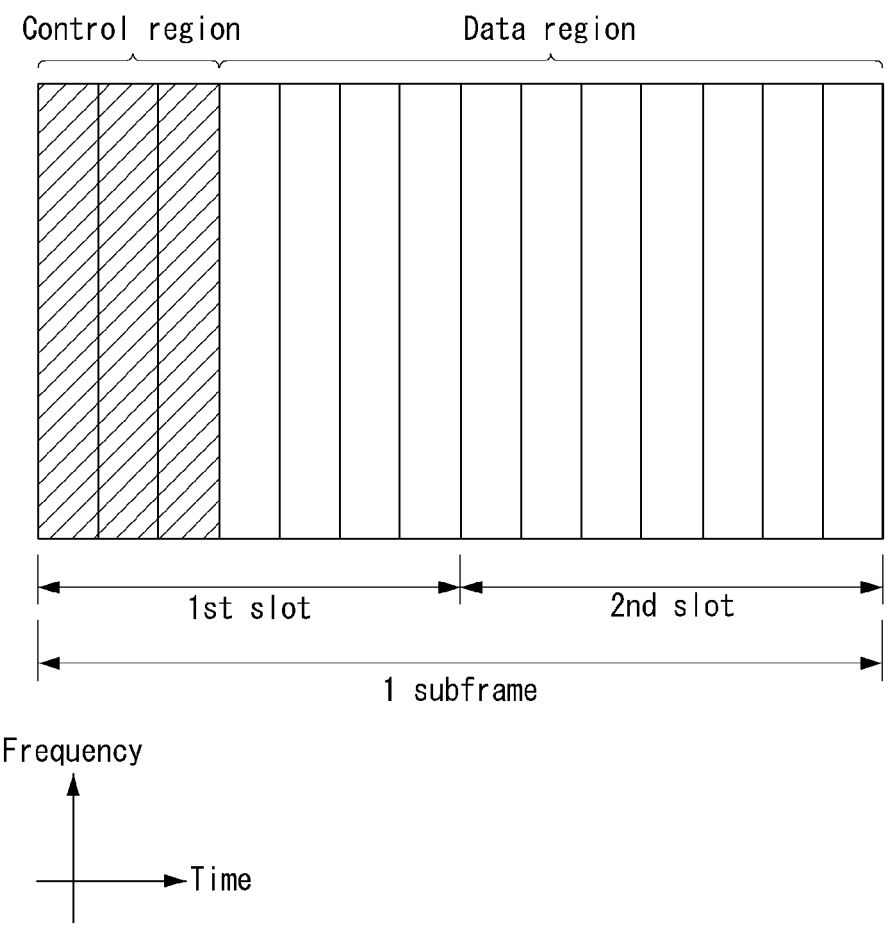
[FIG.3]

[FIG.4]
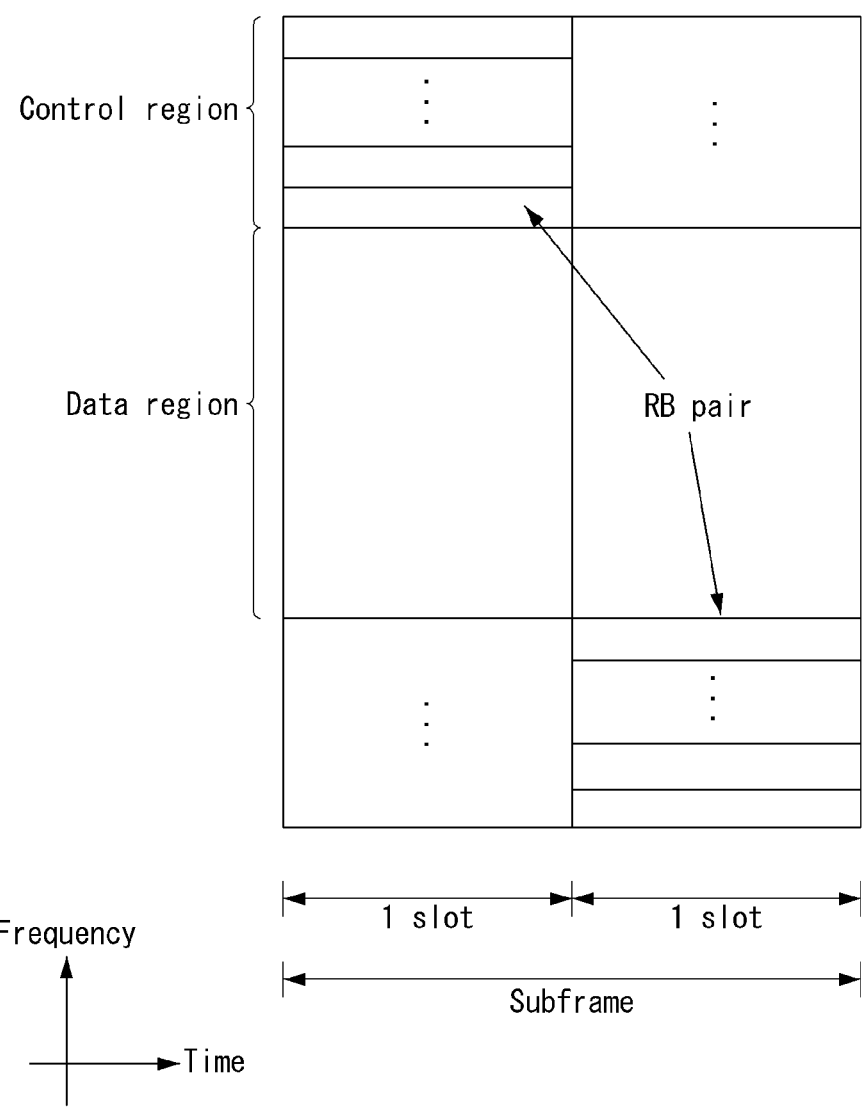

[FIG.5]
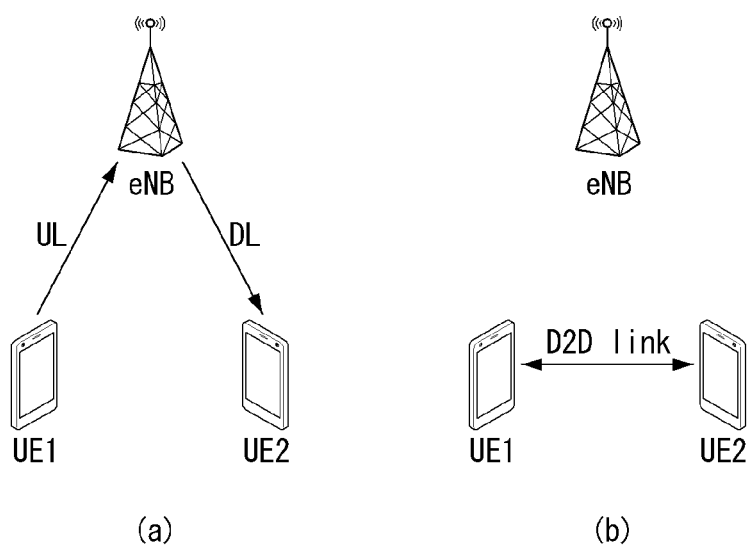

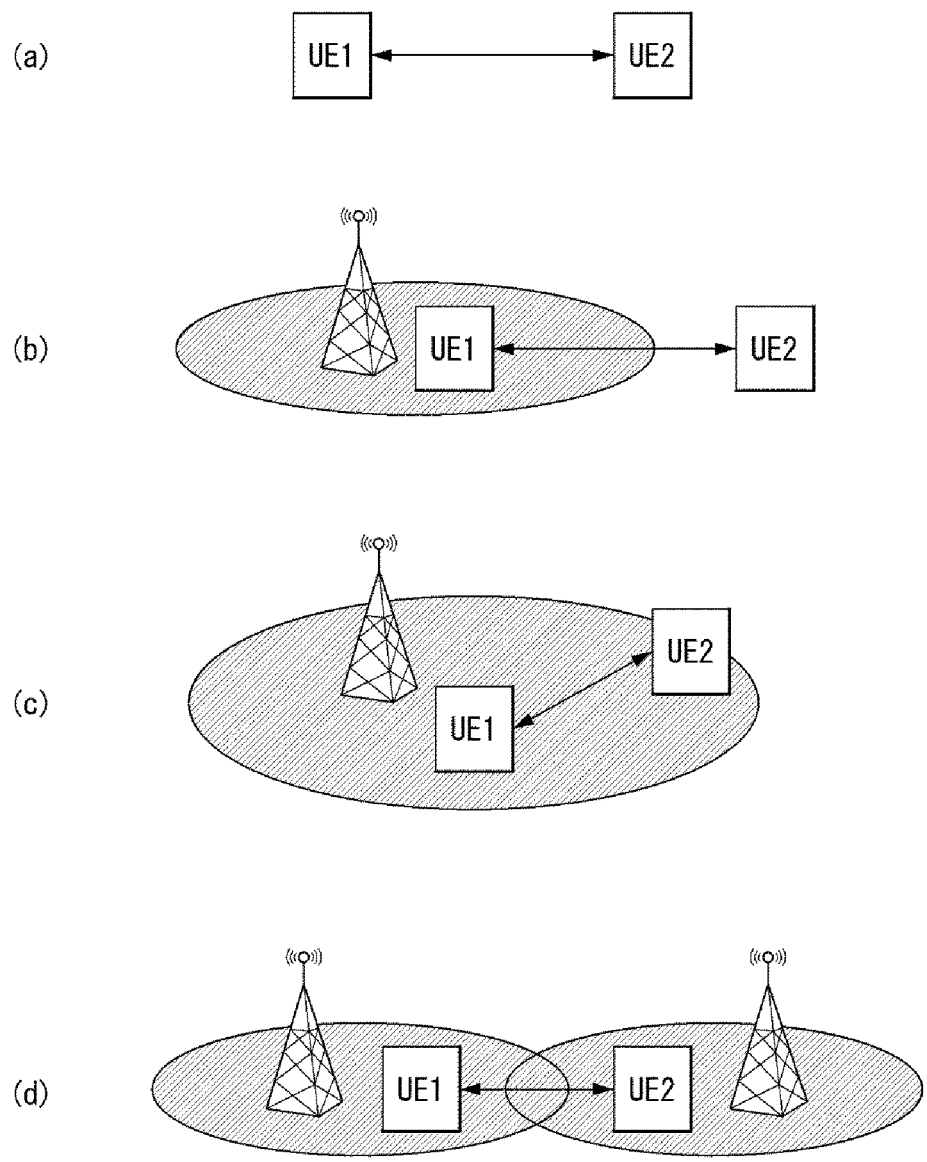

[FIG.7]
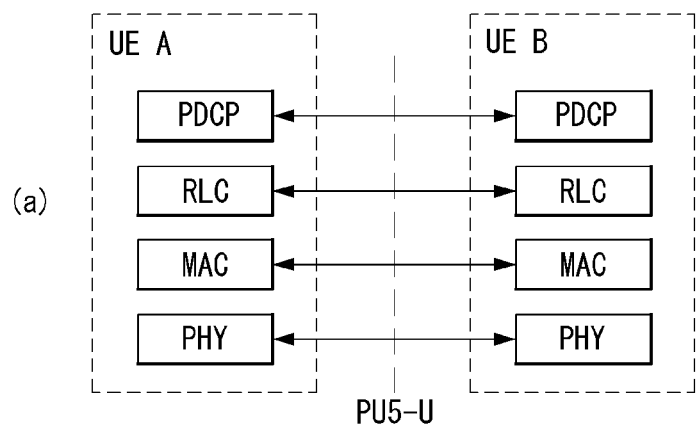
(a)
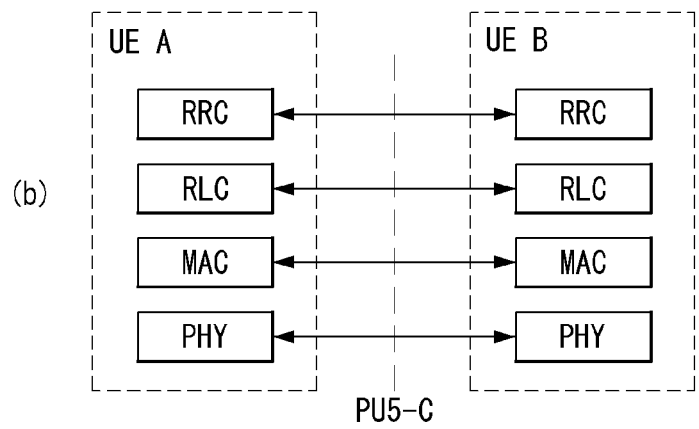
(b)

[FIG.8]
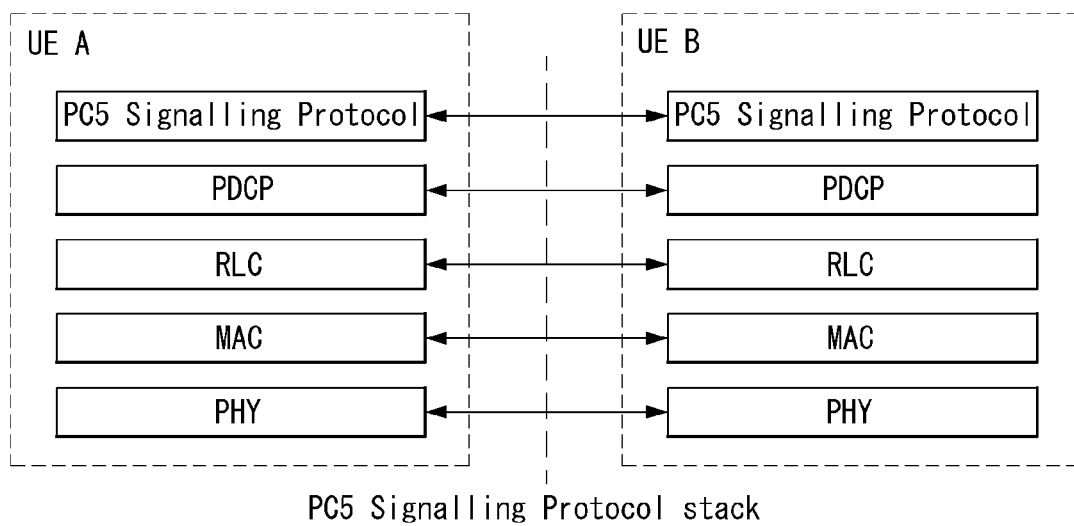
PC5 Signalling Protocol stack

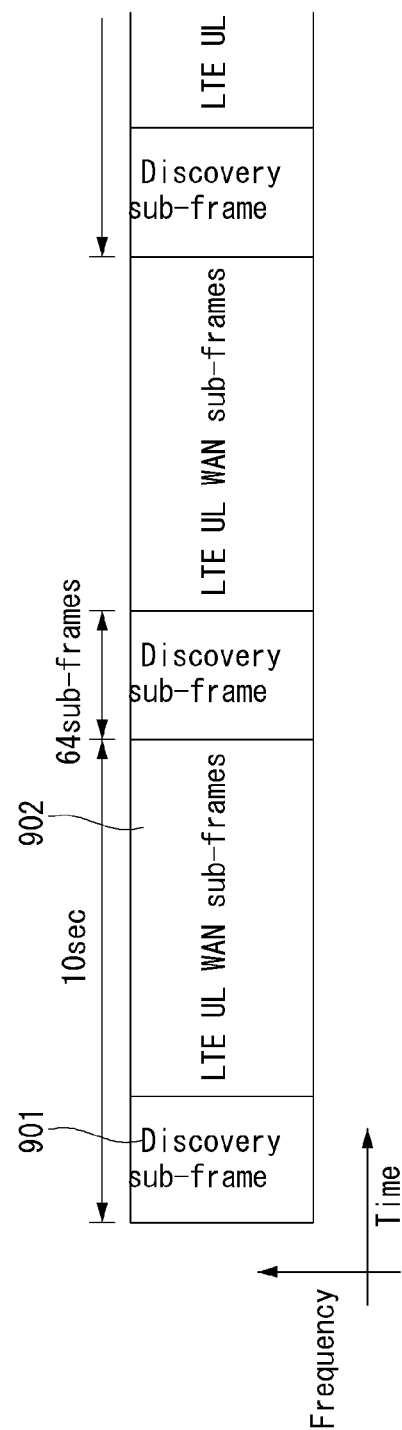
[FIG.9]

[FIG.10]
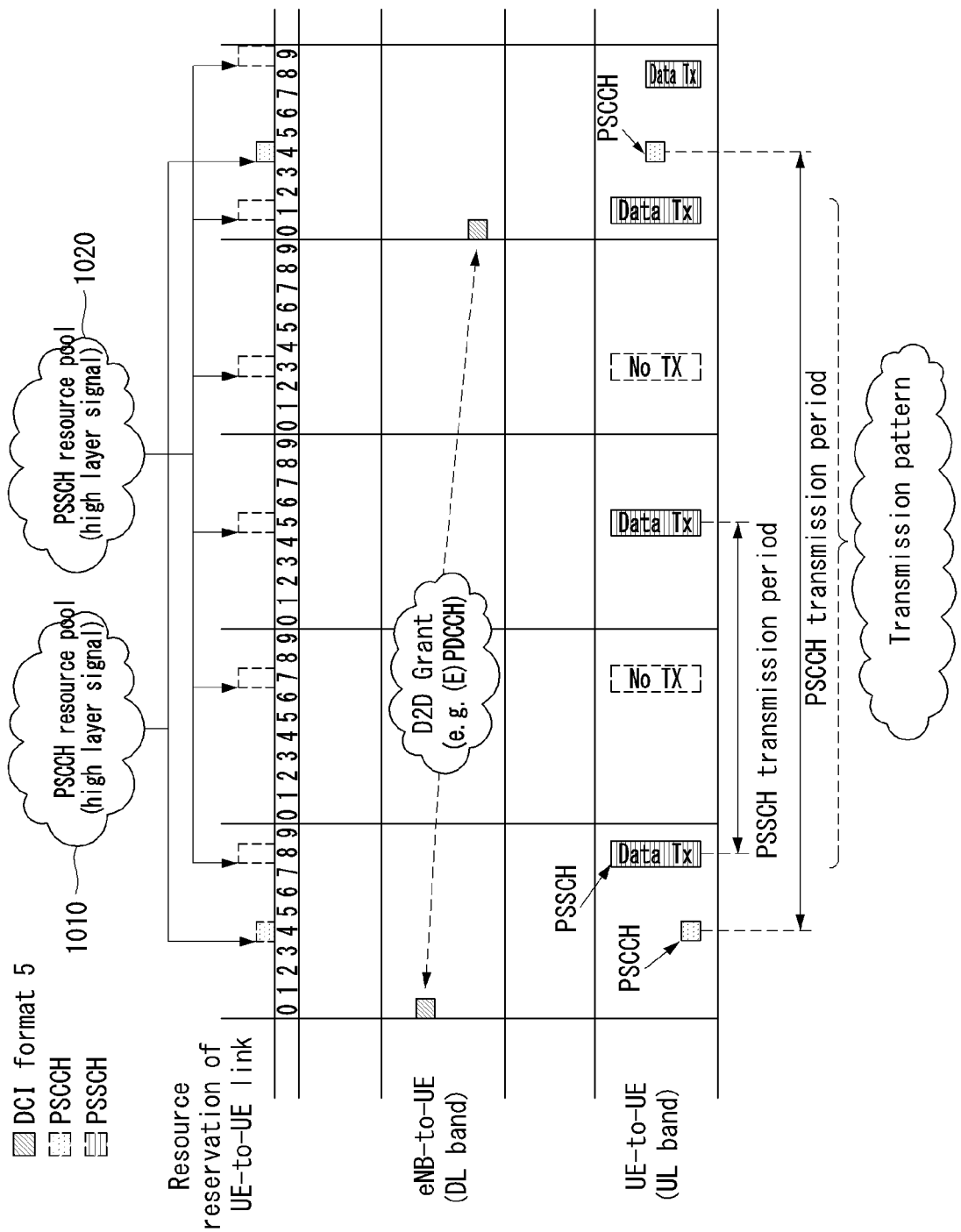

[FIG.11]
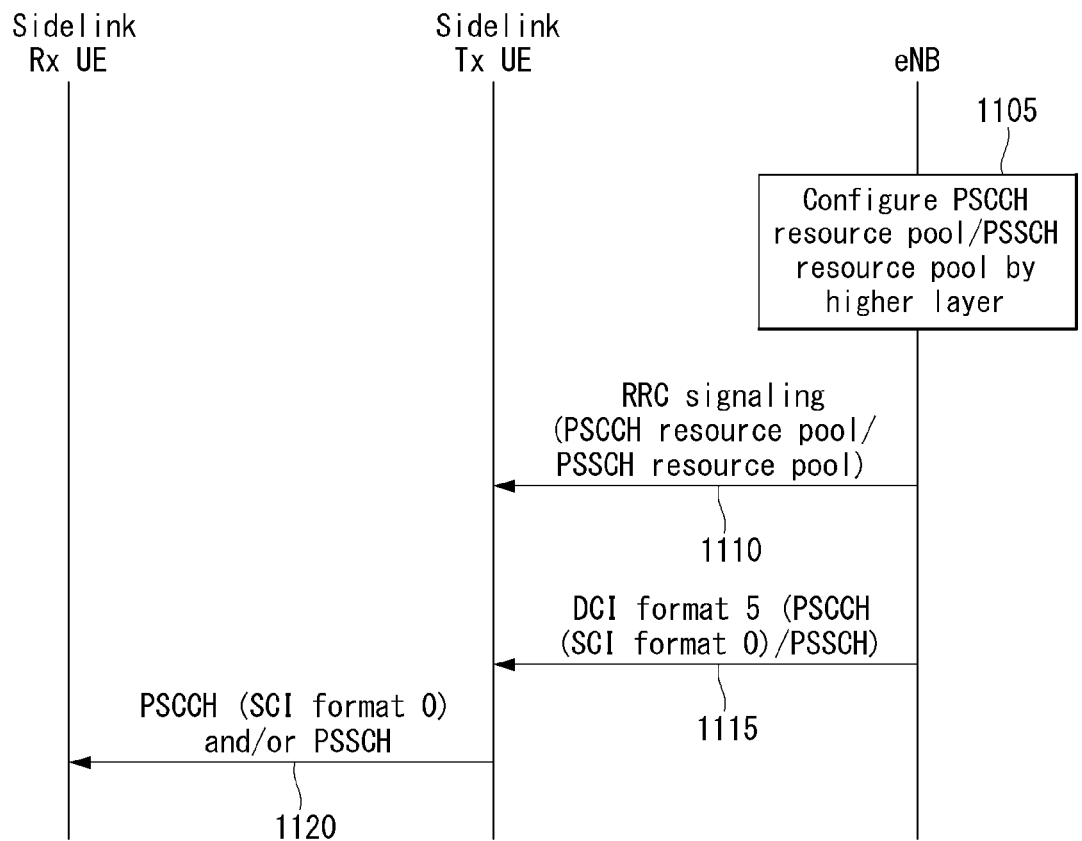
[FIG.12]
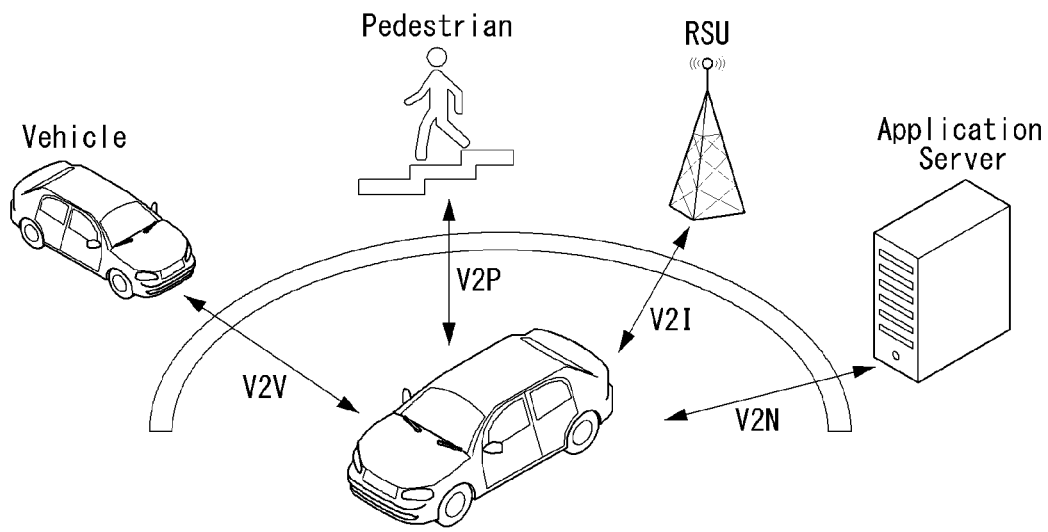

[FIG.13]
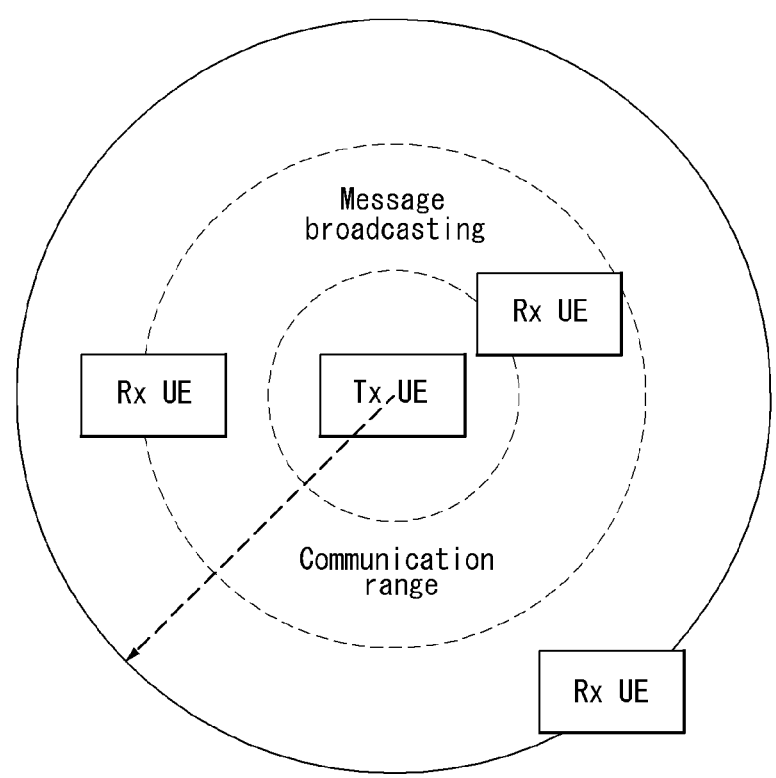

[FIG.14]
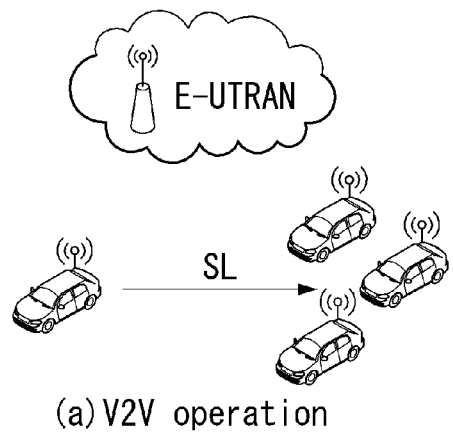
(a) V2V operation
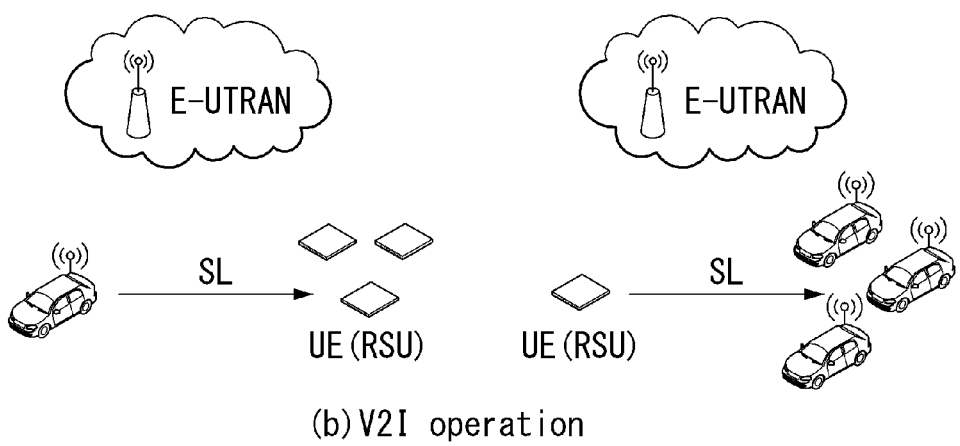
(b) V2I operation
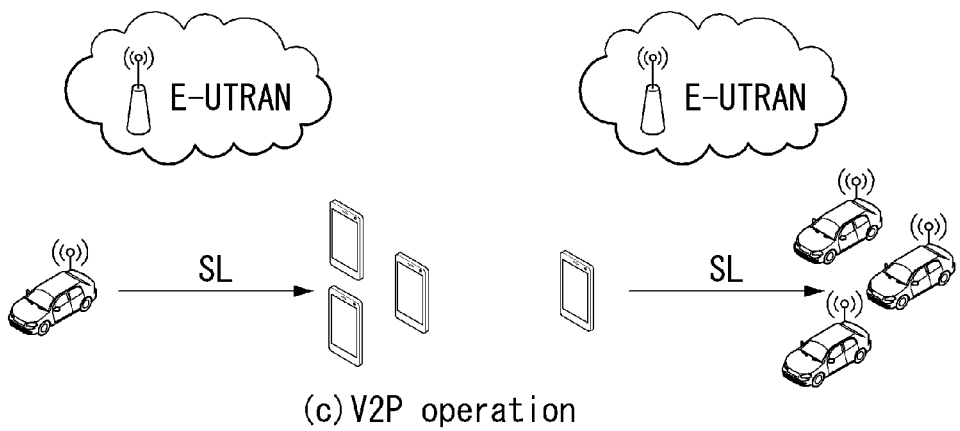
(c) V2P operation

[FIG.15]
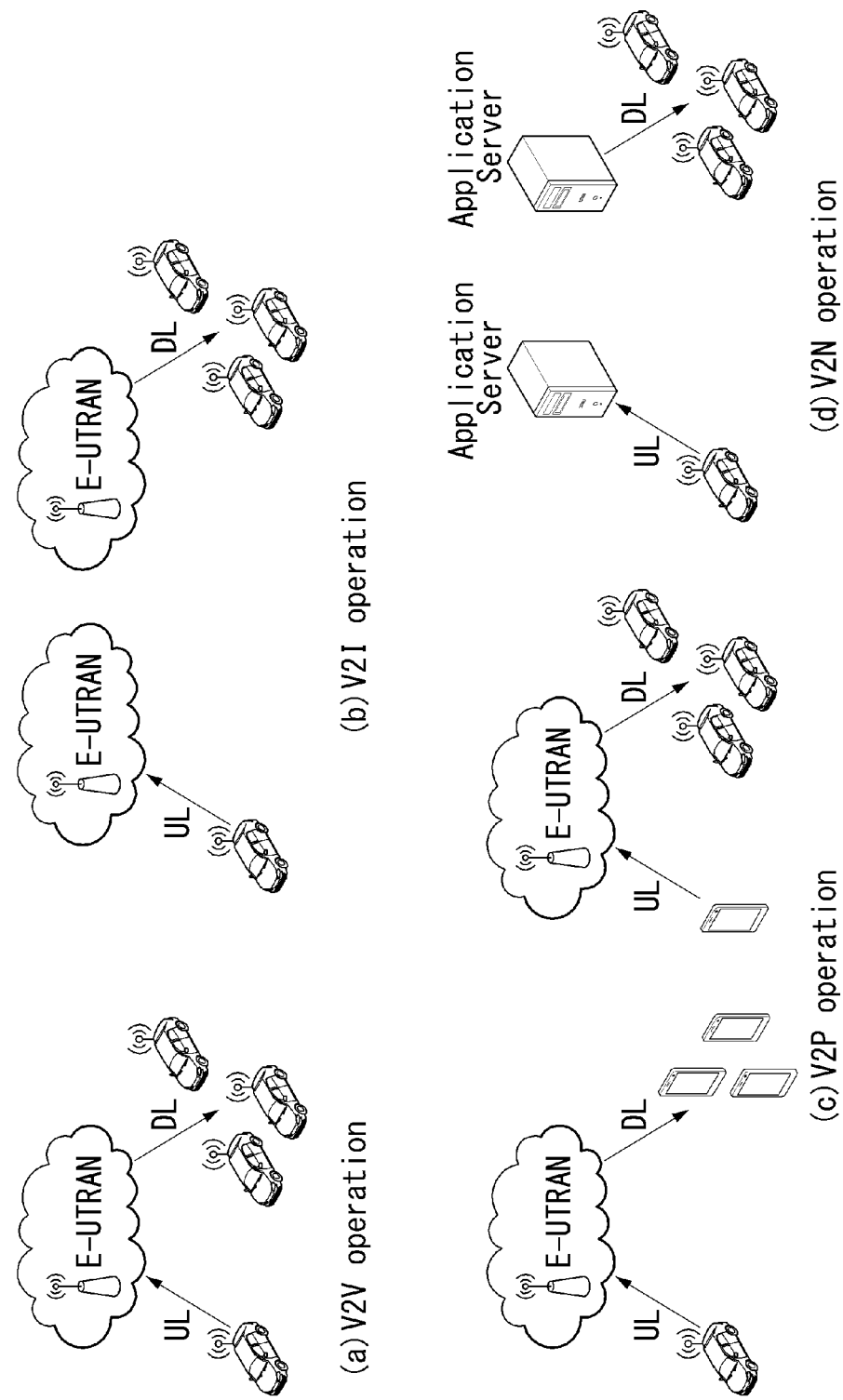

[FIG.16]
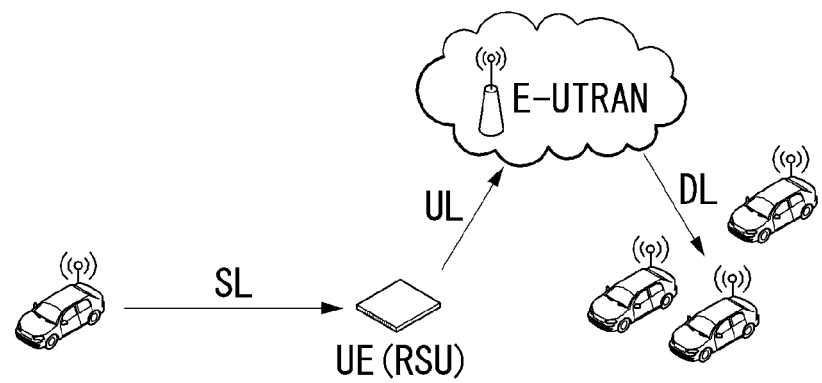
(a) Scenario 3A
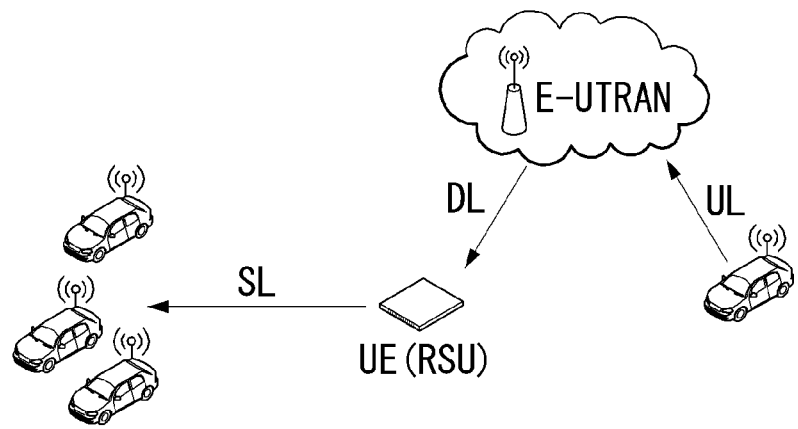
(b) Scenario 3B

[FIG.17]
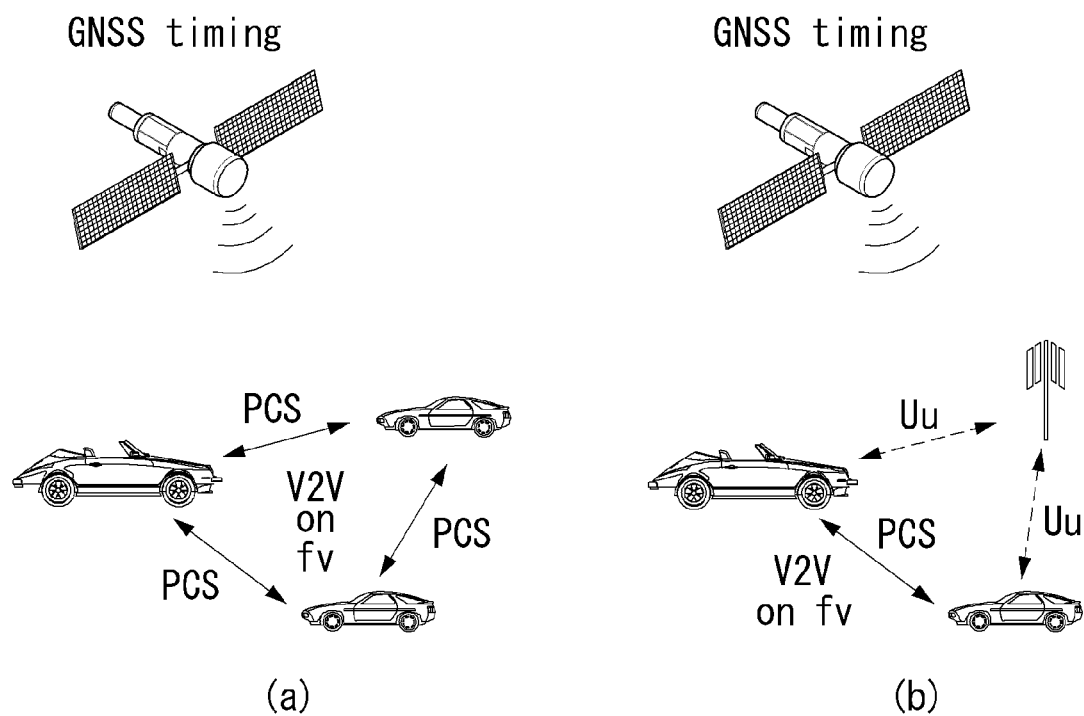

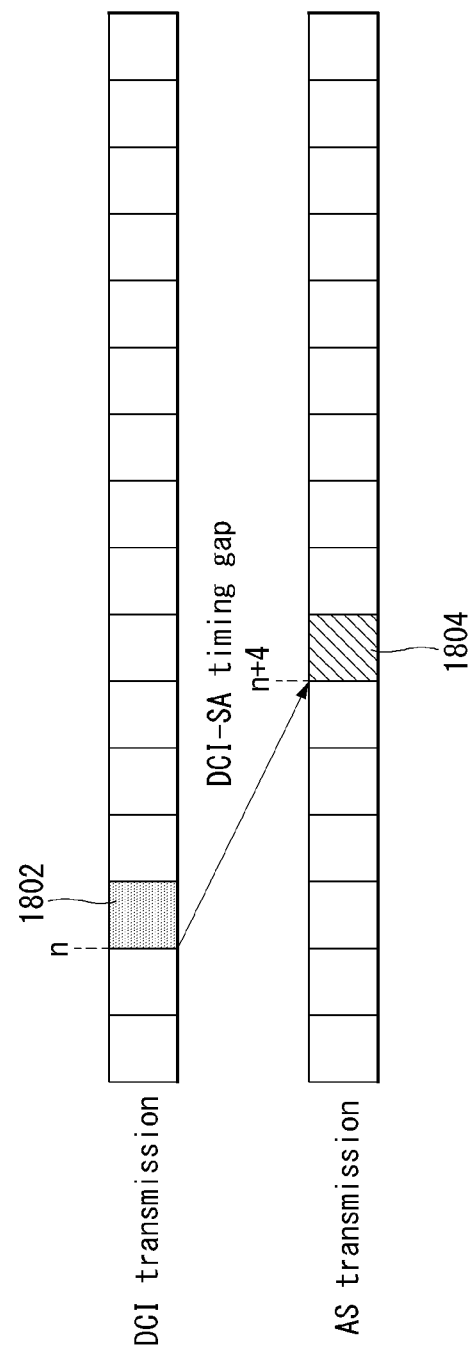
[FIG.18]

[FIG.19]
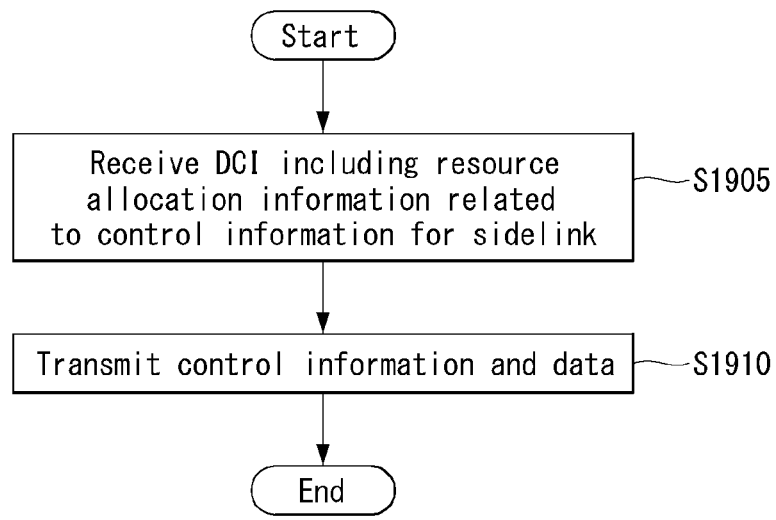
[FIG.20]
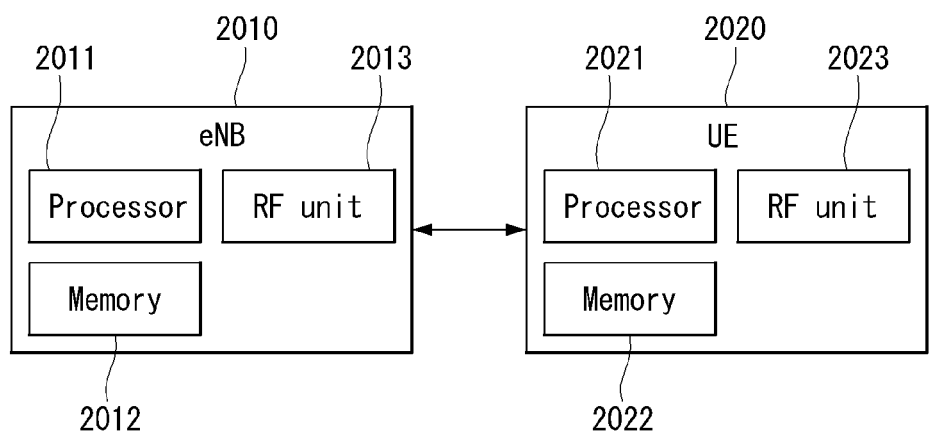

[FIG.21]
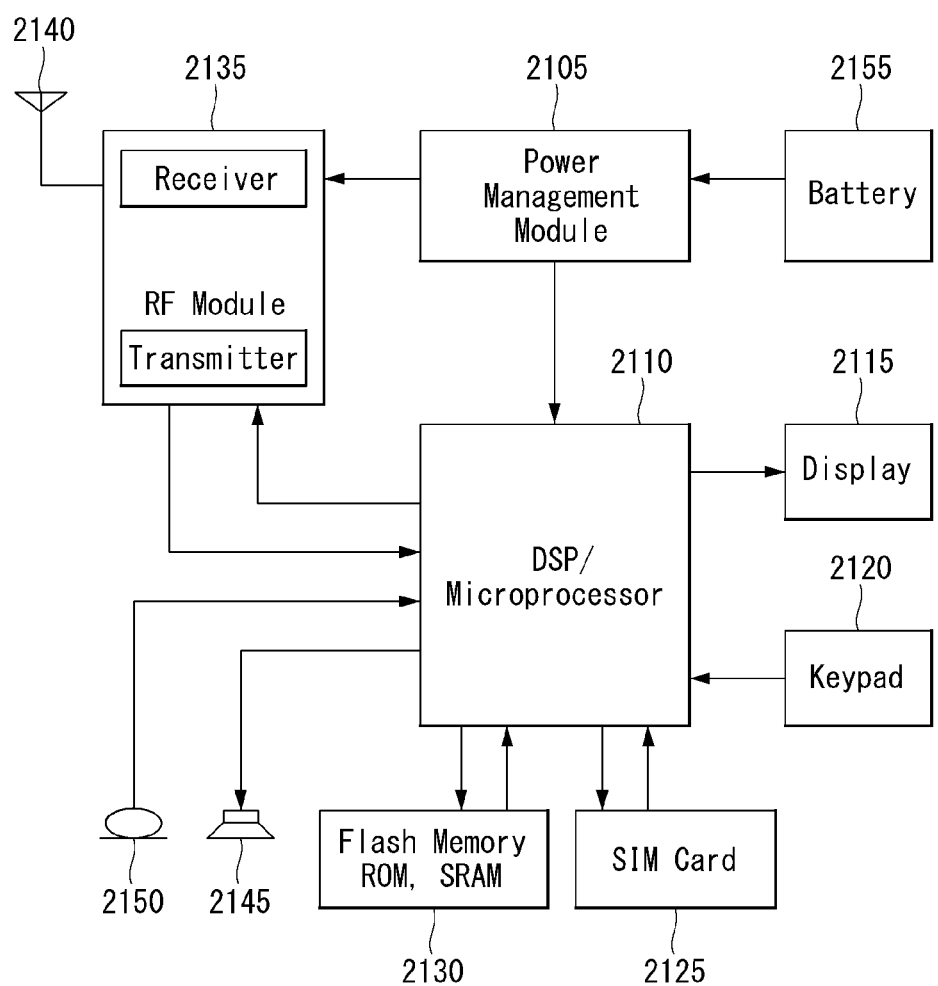

METHOD FOR TRANSMITTING AND RECEIVING DATA IN WIRELESS COMMUNICATION SYSTEM, AND APPARATUS THEREFOR

This application is the National Stage filing under 35 U.S.C. 371 of International Application No. PCT/KR2017/007045, filed on Jul. 3, 2017, which claims the benefit of U.S. Provisional Application No. 62/357,393, filed on Jul. 1, 2016. The contents of which are all hereby incorporated by reference herein in their entirety.

TECHNICAL FIELD

The present invention relates to a wireless communication system and, more particularly, to a method for transmitting and receiving data in a wireless communication system supporting vehicle-to-everything (V2X) and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method for transmitting and receiving data by a user equipment in a wireless communication system supporting vehicle-to-everything (V2X).

Specifically, this specification proposes a method of maintaining the size of a corresponding DCI format identically with the size of another DCI format (e.g., DCI format 0) although additional information is included in a downlink control information (DCI) format used for V2X communication or vehicle-to-vehicle (V2V) communication.

In particular, this specification proposes a method of reducing the size of a field related to scheduling assignment (SA) and/or the resource of data, included in a corresponding DCI format, in order to maintain the size of the corresponding DCI format identically with the size of another DCI format.

Furthermore, this specification proposes a method of adding a field, indicating an MCS index having a reduced number of bits compared to a common MCS indication field, to a corresponding DCI format in order to maintain the size of the corresponding DCI format identically with the size of another DCI format.

Technical objects to be achieved in the present invention are not limited to the above-described technical objects, and other technical objects not described above may be evidently understood by a person having ordinary skill in the art to which the present invention pertains from the following description.

Technical Solution

In a method for transmitting and receiving data in a wireless communication system supporting vehicle-to-everything (V2X) according to an embodiment of the present invention, the method performed by a first user equipment includes receiving, from a base station, downlink control information (DCI) including resource allocation information related to a transmission of control information for a sidelink, transmitting, to a second user equipment, the control information for the sidelink based on the resource allocation information, and transmitting at least one data to the second user equipment. The control information for the sidelink is transmitted in a second subframe positioned after a pre-configured offset from a first subframe in which the downlink control information has been received.

Furthermore, in one embodiment of the present invention, the resource allocation information may include resource allocation information having a size adjusted based on at least one of transmission unit on a frequency domain related to the transmission of the control information for the sidelink or the pre-configured offset.

Furthermore, in one embodiment of the present invention, the transmission unit on the frequency domain related to the transmission of the control information for the sidelink may include a subchannel unit configured with a pre-configured number of resource blocks.

Furthermore, in one embodiment of the present invention, the number of bits configuring a DCI format related to the downlink control information may be configured to be identical with the number of bits configuring another DCI format.

Furthermore, in one embodiment of the present invention, when the first subframe is a subframe # n, the second subframe may include a subframe # n+k or a first sidelink subframe generated after the subframe # n+k.

Furthermore, in one embodiment of the present invention, the downlink control information may further include specific information representing a modulation and coding scheme (MCS) index for the transmission of the at least one data.

Furthermore, in one embodiment of the present invention, the specific information may include information representing a specific message set among pre-configured message sets, and the pre-configured message sets may be configured based on at least one of an MCS index related to the transmission of the at least one data, the number of transport blocks or the number of resource blocks.

Furthermore, in one embodiment of the present invention, the specific information may be configured as a number of bits smaller than 5 bits, and the number of bits configuring the DCI format related to the downlink control information may be configured to be identical with a number of bits configuring another DCI format.

Furthermore, in one embodiment of the present invention, the downlink control information may further include information indicating whether the transmission of the control information for the sidelink and the at least one data is performed based on semi-persistent scheduling.

Furthermore, in a first user equipment transmitting and receiving data in a wireless communication system supporting vehicle-to-everything (V2X) according to another embodiment of the present invention, the first user equipment includes a transceiver unit for transmitting and receiving radio signals and a processor functionally connected to the transceiver unit. The processor is configured to receive, from a base station, downlink control information (DCI) including resource allocation information related to a transmission of control information for a sidelink, transmit, to a second user equipment, the control information for the sidelink based on the resource allocation information, and transmit at least one data to the second user equipment. The control information for the sidelink is transmitted in a second subframe positioned after a pre-configured offset from a first subframe in which the downlink control information has been received.

Advantageous Effects

In accordance with an embodiment of the present invention, an increase in the number of blind decodings of a UE and unnecessary blind decoding overhead can be prevented by maintaining the size of a DCI format, used for specific sidelink communication (e.g., vehicle-to-vehicle (V2V) communication, vehicle-to-everything (V2X)) identically with the size of another DCI format.

Furthermore, in accordance with an embodiment of the present invention, resource scheduling between a base station and a UE can be efficiently performed because the size of a DCI format itself can be reduced.

Furthermore, in accordance with an embodiment of the present invention, the uncertainty of SA detection in another UE can be reduced because a UE transmits SA at a specific location on the basis of the reception location of DCI.

Furthermore, in accordance with an embodiment of the present invention, if information on an MCS is included in DCI, although a specific UE fails in SA detection, the corresponding UE can obtain information on an MCS necessary for message transmission through the DCI.

Effects which may be obtained in the present invention_are not limited to the above-described effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 is a diagram for conceptually illustrating D2D communication in a wireless communication system to which the present invention may be applied.

FIG. 6 illustrates examples of various scenarios D2D communication to which a method proposed in this specification may be applied.

FIG. 7 illustrates a protocol stack for sidelink communication.

FIG. 8 illustrates a control plane protocol stack for one-to-one sidelink communication to which the present invention may be applied.

FIG. 9 is a diagram for illustrating a distributed discovery resource allocation method in a wireless communication system supporting a sidelink.

FIG. 10 illustrates a method of performing a sidelink operational procedure in a sidelink communication mode 1 based on control of a base station and sidelink communication by transmitting and receiving related information.

FIG. 11 illustrates a downlink control information transmission method for sidelink communication between UEs in a wireless communication system supporting sidelink communication.

FIG. 12 illustrates the type of V2X application to which the present invention may be applied.

FIG. 13 illustrates broadcast-based V2V communication to which the present invention may be applied.

FIG. 14 illustrates examples of a V2X operation mode based on a PC5 interface only.

FIG. 15 illustrates examples of a V2X operation mode based on a Uu interface only.

FIG. 16 illustrates examples of a V2X operation mode based on both the Uu interface and the PC5 interface.

FIG. 17 illustrates examples of scheduling methods which may be applied to V2V sidelink communication.

FIG. 18 illustrates an example of an SA transmission method according to an embodiment of the present invention.

FIG. 19 illustrates an operational flowchart of transmitting and receiving data by a first user equipment in a wireless communication system supporting sidelink communication according to various embodiments of the present invention.

FIG. 20 illustrates a block diagram of a wireless communication apparatus to which methods proposed in this specification may be applied.

FIG. 21 illustrates a block diagram of a communication apparatus according to an embodiment of the present invention.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

For purpose of the present invention, the following terms and definitions apply.

Carrier frequency: Center frequency of the cell.

Cell: Combination of downlink and optionally uplink resources. The linking between the carrier frequency of the downlink resources and the carrier frequency of the uplink resources is indicated in the system information transmitted on the downlink resources.

Frequency layer: Set of cells with the same carrier frequency.

Sidelink: UE to UE interface for sidelink communication, V2X sidelink communication and sidelink discovery.

Sidelink Control period, SC period: Period over which resources are allocated in a cell for sidelink control information and sidelink data transmissions.

Sidelink communication: AS functionality enabling ProSe Direct Communication between two or more nearby UEs, using E-UTRA technology but not traversing any network node.

Sidelink discovery: AS functionality enabling ProSe Direct Discovery using E-UTRA technology but not traversing any network node).

Timing Advance Group, TAG: A group of serving cells that is configured by RRC and that, for the cells with an UL configured, use the same timing reference cell and the same Timing Advance value.

V2X sidelink communication: AS functionality enabling V2X Communication between nearby UEs, using E-UTRA technology but not traversing any network node.

The following abbreviations apply for purpose of the present invention.

ACK Acknowledgement
ARQ Automatic Repeat Request
CC Component Carrier
C-RNTI Cell RNTI
DCCH Dedicated Control Channel
DL Downlink
DwPTS Downlink Pilot Time Slot
eNB E-UTRAN NodeB
EPC Evolved Packet Core
EPS Evolved Packet System
E-RAB E-UTRAN Radio Access Bearer
E-UTRA Evolved UTRA
E-UTRAN Evolved UTRAN
FDD Frequency Division Duplex
FDM Frequency Division Multiplexing
LTE Long Term Evolution
MAC Medium Access Control
MCS Modulation and Coding Scheme
OFDM Orthogonal Frequency Division Multiplexing
OFDMA Orthogonal Frequency Division Multiple Access
ProSe Proximity based Services
PSBCH Physical Sidelink Broadcast CHannel
PSCCH Physical Sidelink Control CHannel
PSDCH Physical Sidelink Discovery CHannel
PSK Pre-Shared Key
PSSCH Physical Sidelink Shared CHannel
PUCCH Physical Uplink Control CHannel
PUSCH Physical Uplink Shared CHannel
QoS Quality of Service
RRC Radio Resource Control
SI System Information
SIB System Information Block
SL-BCH Sidelink Broadcast Channel
SL-DCH Sidelink Discovery Channel
SL-RNTI Sidelink RNTI
SL-SCH Sidelink Shared Channel
STCH Sidelink Traffic Channel
TB Transport Block
TDD Time Division Duplex
TDM Time Division Multiplexing
TTI Transmission Time Interval UE User Equipment
UL Uplink
UM Unacknowledged Mode
V2I Vehicle-to-Infrastructure
V2N Vehicle-to-Network
V2P Vehicle-to-Pedestrian
V2V Vehicle-to-Vehicle
V2X Vehicle-to-Everything
General System FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of T_s=1/(15000*2048). The downlink and uplink transmissions are composed of radio frames having intervals of T_f=307200*T_s=10 ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of T_slot=15360*T_s=0.5 ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPOCH by merging different numbers of ECCEs. The EPOCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH is frequency-hopped in a slot boundary.

Device-to-Device (23D) Communication

A device-to-device (D2D) communication or sidelink technology refers to a method of directly communicating with each other by geographically close UEs without the intervention of infrastructure, such as a base station. In the D2D communication technology, a technology chiefly using a non-licensed frequency band, such as already commercialized Wi-Fi Direct and Bluetooth, has been developed. However, for the purpose of improving frequency use efficiency of the cellular system, a D2D communication technology using a licensed frequency band has been developed and standardization thereof is performed.

In general, D2D communication is limitedly used as a term to refer to communication between things and thing intelligent communication. However, D2D communication in the present invention may include all types of communication between simple devices having a communication function and various types of devices having a communication function, such as smartphones or personal computers.

D2D communication may also be called a sidelink or sidelink transmission.

A sidelink includes sidelink discovery, sidelink communication, and V2X sidelink communication between UEs.

FIG. 5 is a diagram for conceptually illustrating D2D communication in a wireless communication system to which the present invention may be applied.

FIG. 5(a) illustrates a communication method based on the existing eNB. A UE 1 may transmit data to the eNB on uplink, and the eNB may transmit data to a UE 2 on downlink. Such a communication method may be called an indirect communication method through an eNB. In the indirect communication method, an Xn link (link between eNBs or link between an eNB and a relay and may be called a backhaul link), that is, a link defined in the existing wireless communication system and/or an Uu link (link between an eNB and a UE or link between a relay and a UE, and may be called an access link) may be related.

FIG. 5(b) illustrates a UE-to-UE communication method as an example of D2D communication. A data exchange between UEs may be performed without the intervention of an eNB. Such a communication method may be called a direct communication method between devices. The D2D direct communication method has advantages in that latency is reduced compared to an indirect communication method through the existing eNB and less radio resources are used.

FIG. 6 illustrates examples of various scenarios D2D communication to which a method proposed in this specification may be applied.

The scenario of D2D communication may be basically divided into (1) Out-of-Coverage Network, (2) Partial-Coverage Network and (3) In-Coverage Network depending on whether a UE 1 and a UE 2 are located in-coverage/out-of-coverage.

In-Coverage Network may be divided into In-Coverage-Single-Cell and In-Coverage-Multi-Cell based on the number of cells corresponding to coverage of an eNB.

FIG. 6(a) illustrates an example of the Out-of-Coverage Network scenario of D2D communication. The Out-of-Coverage Network scenario means that D2D UEs perform D2D communication without control of an eNB. From FIG. 6(a), it may be seen that only a UE 1 and a UE 2 are present and the UE 1 and the UE 2 perform direct communication.

FIG. 6(b) illustrates an example of the Partial-Coverage Network scenario of D2D communication. The Partial-Coverage Network scenario means that a D2D UE in coverage of a network and a D2D UE out of coverage of the network perform D2D communication. From FIG. 6(b), it may be seen that a UE 1 in coverage of a network and a UE 2 out of coverage of the network communicate with each other.

FIG. 6(c) illustrates an example of the In-Coverage-Single-Cell scenario. FIG. 8(d) illustrates an example of the In-Coverage-Multi-Cell scenario. The In-Coverage Network scenario means that D2D UEs perform D2D communication through control of an eNB in coverage of a network. In FIG. 6(c), a UE 1 and a UE 2 are located in the same network coverage (or cell) and perform D2D communication under the control of an eNB.

In FIG. 6(d), a UE 1 and a UE 2 are located in coverage of networks, but are located in coverage of different networks. Furthermore, the UE 1 and the UE 2 perform D2D communication under the control of eNBs managing respective network coverages.

Hereinafter, D2D communication or a sidelink are described more specifically.

D2D communication may operate in the scenarios shown in FIG. 6. In general, D2D communication may operate in coverage of a network and out of coverage of a network. A link used for direct communication between UEs may be referred to as a sidelink, directlink or D2D link, but is collectively called a sidelink, for convenience of description.

Sidelink transmission may operate in an uplink spectrum in the case of FDD, and may operate in an uplink (or downlink) subframe in the case of TDD. For the multiplexing sidelink transmission and uplink transmission, time division multiplexing (TDM) may be used.

Depending on the capability of a UE, sidelink transmission and uplink transmission do not occur in a specific UE at the same time. Sidelink transmission does not occur in an uplink subframe used for uplink transmission or a sidelink subframe overlapping an UpPTS partially or fully. Furthermore, sidelink transmission and downlink transmission do not occur at the same time. Furthermore, the transmission and reception of a sidelink do not occur at the same time.

The structure of a physical resource used for sidelink transmission may be the same as the structure of an uplink physical resource. However, the last symbol of a sidelink subframe has a guard period and is not used for sidelink transmission.

A sidelink subframe may have an extended CP or a normal CP.

Sidelink communication may be basically divided into sidelink discovery, sidelink communication, sidelink synchronization, and vehicle-to-everything (V2X) sidelink communication.

Sidelink communication is communication mode in which a UE can perform direct communication through a PC5 interface. The communication mode is supported when a UE is served by an E-UTRAN and when a UE is out of coverage of E-UTRA.

Only UEs permitted to be used for a public safety operation may perform sidelink communication.

In order to perform synchronization for an out-of-coverage operation, a UE(s) may operate as a synchronization source by transmitting a sidelink broadcast control channel (SBCCH) and a synchronization signal.

An SBCCH delivers the most important system information necessary to receive a different sidelink channel and a signal. The SBCCH is transmitted in a fixed period of 40 ms along with a synchronization signal. When a UE is in network coverage, the contents of the SBCCH are derived or obtained from a parameter signaled by an eNB.

When a UE is out of coverage, if the UE selects another UE as a synchronization criterion, the contents of an SBCCH are derived from a received SBCCH. If not, the UE uses a pre-configured parameter. A system information block (SIB) 18 provides a synchronization signal and resource information for SBCCH transmission.

For an out-of-coverage operation, two pre-configured subframes are present every 40 ms. A UE receives a synchronization signal and SBCCH in one subframe. When the UE becomes a synchronization source based on a defined criterion, it transmits a synchronization signal and SBCCH in another subframe.

A UE performs sidelink communication on defined subframes during a sidelink control period. The sidelink control period is the period in which resources allocated to a cell occur for sidelink control information and sidelink data transmission. The UE transmits sidelink control information and sidelink data within the sidelink control period.

The sidelink control information indicates a layer 1 ID and transmission characteristics (e.g., MCS, the location of a resource for a sidelink control period and timing alignment).

A UE performs transmission/reception through the Uu and PC5 in order of the following lower priority if a sidelink discovery gap has not been configured.

Uu transmission/reception (highest priority);
PC5 sidelink communication transmission and reception;
PC5 sidelink discovery announcement/monitoring (lowest priority).

A UE performs transmission and reception through the Uu and PC5 in order of the following lower priority if a sidelink discovery gap has been configured:

Uu transmission/reception for RACH;
PC5 sidelink discovery announcement during a Sidelink Discovery Gap for transmission;
Non-RACH Uu transmission;
PC5 sidelink discovery monitoring during a Sidelink Discovery Gap for reception;
Non-RACH Uu reception;
PC5 sidelink communication transmission and reception.

Sidelink radio protocol structure

A UE radio protocol structure for sidelink communication with respect to a user plane and a control plane is described.

FIG. 7 illustrates a protocol stack for sidelink communication.

Specifically, FIG. 7(a) illustrates a protocol stack for a user plane in which a PDCP, RLC and MAC sublayer (end in another UE) perform functions on a user plane. The access layer protocol stack of a PC5 interface includes a PDCP, RLC, MAC and PHY as shown in FIG. 7(a).

User plane detailed information of sidelink communication:

There is no HARQ feedback for sidelink communication.
RLC UM is used for sidelink communication.
A receiver UE needs to maintain at least one RLC UM entity every transmission peer UE.
A reception RLC UM entity used for sidelink communication does not need to be configured prior to the reception of a first RLC UMD PDU.
ROHC unidirectional mode is used for the header compression of a PDCP for additional communication.
A UE may configure a plurality of logical channels. An LCID included in a MAC subheader uniquely identifies a logical channel within the range of one Source Layer-2 ID and Destination Layer-2 ID combination. A parameter for logical channel priority is not configured.
An access layer (AS) is provided along with a ProSe Per-Packet Priority (PPPP) of a protocol data unit transmitted through the PC5 interface in a higher layer. There is a PPPP related to each logical channel.
A UE configures and does not maintain a logical connection to receiver UEs prior to one-to-multiple sidelink communication. A higher layer configures and maintains a logical connection for one-to-one sidelink communication, including a ProSe UE-to-Network Relay task.

FIG. 7(b) illustrates a control plane protocol stack for an SBCCH to which the present invention may be applied. In the PC5 interface, an access layer protocol stack for an SBCCH includes RRC, RLC, MAC and PHY as in FIG. 7(b).

A control plane for configuring, maintaining and releasing a logical connection for one-to-one sidelink communication is shown in FIG. 8.

FIG. 8 illustrates a control plane protocol stack for one-to-one sidelink communication to which the present invention may be applied.

Sidelink Discovery

In sidelink communication, since a plurality of transmitter/receiver UEs is distributed at a given location, a sidelink discovery procedure for confirming the presence of surrounding UEs is necessary before a specific UE perform sidelink communication with surrounding UEs. Furthermore, sidelink discovery may be used to confirm the presence of surrounding UEs and used for various commercial purposes, such as advertising, issuing coupons and finding friends, with respect to UEs within a proximity area.

Sidelink discovery may be applied within network coverage (including inter-cell, intra-cell). In inter-cell discovery, both synchronous and asynchronous cell deployments may be taken into consideration.

In this case, a signal (or message) periodically transmitted by UEs for sidelink discovery may be referred to as a discovery message, discovery signal, a beacon, etc. Hereinafter, a signal periodically transmitted by UEs for sidelink discovery is collectively called a discovery message, for convenience of description.

If a UE 1 has the role of discovery message transmission, the UE 1 transmits a discovery message, and a UE 2 receives the discovery message. The transmission and reception roles of the UE 1 and the UE 2 may be changed. Transmission from the UE 1 may be received by one or more UE(s), such as the UE 2.

A discovery message may include a single MAC PDU. In this case, the single MAC PDU may include a UE ID and an application ID.

A physical sidelink discovery channel (PSDCH) may be defined as a channel in which a discovery message is transmitted. The structure of a PSDCH channel may reuse a PUSCH structure.

Two types (sidelink discovery type 1 and sidelink discovery type 2B) may be used as a resource allocation method for sidelink discovery.

In the case of the sidelink discovery type 1, an eNB may allocate a resource for discovery message transmission in a non-UE-specific manner.

Specifically, a radio resource pool (i.e., discovery pool) for discovery transmission and reception, including a plurality of subframe sets and a plurality of resource block sets, is allocated within a specific period (hereinafter "discovery period"). A discovery transmitter UE randomly selects a specific resource within the radio resource pool and then transmits a discovery message.

Such a periodical discovery resource pool may be allocated for discovery signal transmission in a semi-static manner. Configuration information of a discovery resource pool for discovery transmission includes a discovery period, a subframe set which may be used for the transmission of a discovery signal within a discovery period, and resource block set information.

Such configuration information of a discovery resource pool may be transmitted to a UE by higher layer signaling. In the case of an in-coverage UE, a discovery resource pool for discovery transmission is configured by an eNB, and a UE may be notified of the discovery resource pool through RRC signaling (e.g., a system information block (SIB)).

A discovery resource pool allocated for discovery within one discovery period may be multiplexed with a time-frequency resource block having the same size through TDM and/or FDM. A time-frequency resource block having the same size may be referred to as a "discovery resource." A discovery resource may be divided as one subframe unit, and may include two physical resource blocks (PRBs) per slot in each subframe. One discovery resource may be used for the transmission of a discovery MAC PDU by one UE.

Furthermore, a UE may repeatedly transmit a discovery signal within a discovery period for the transmission of one transport block. The transmission of a MAC PDU transmitted by one UE may be repeated (e.g., repeated four times) contiguously or non-contiguously within a discovery period (i.e., radio resource pool). The number of transmissions of a discovery signal for one transport block may be transmitted by a UE through higher layer signaling.

A UE randomly selects the first discovery resource in a discovery resource set which may be used for the repeated transmission of a MAC PDU. Other discovery resources may be determined in relation to the first discovery resource. For example, a specific pattern may be pre-configured, and a next discovery resource may be determined according to a pre-configured pattern based on the location of a discovery resource first selected by a UE. Furthermore, the UE may randomly select each discovery resource within a discovery resource set which may be used for the repeated transmission of a MAC PDU.

In the sidelink discovery type 2, a resource for discovery message transmission is allocated in a UE-specific manner. Type 2 is subdivided into Type 2A and Type 2B. Type 2A is a method in which an eNB allocates a resource at each transmission instance of a discovery message by a UE within a discovery period. Type 2B is a method of allocating a resource in a semi-persistent manner.

In the case of the sidelink discovery type 2B, a RRC_CONNECTED UE requests the allocation of a resource for the transmission of a sidelink discovery message from an eNB through RRC signaling. Furthermore, the eNB may allocate the resource through RRC signaling. When the UE makes transition to an RRC_IDLE state or the eNB withdraws resource allocation through RRC signaling, the UE releases the most recently allocated transmission resource. As described above, in the case of the sidelink discovery type 2B, a radio resource may be allocated by RRC signaling, and the activation/deactivation of radio resources allocated by a PDCCH may be determined.

A radio resource pool for discovery message reception is configured by an eNB, and a UE may be notified of the radio resource pool using RRC signaling (e.g., a system information block (SIB)).

A discovery message receiver UE monitors both the discovery resource pools of the sidelink discovery type 1 and type 2 for discovery message reception.

A sidelink discovery method may be divided into a centralized discovery method assisted by a central node, such as an eNB, and a distributed discovery method for a UE autonomously to confirm the presence of a surrounding UE without the help of a central node.

In this case, in the case of the distributed discovery method, a dedicated resource may be periodically allocated separately from a cellular resource as a resource for a UE to transmit and receive discovery messages.

FIG. 9 is a diagram for illustrating a distributed discovery resource allocation method in a wireless communication system supporting a sidelink.

Referring to FIG. 9, in the distributed discovery method, a discovery subframe (i.e., "discovery resource pool") 901 for discovery among all cellular uplink frequency-time resources is fixedly (or dedicatedly) allocated, and the remaining region may include the existing LTE uplink wide area network (WAN) subframe region 902. The discovery resource pool may include one or more subframes.

The discovery resource pool may be periodically allocated at a specific time interval (i.e., "discovery period" or "PSDCH period"). Furthermore, the discovery resource pool may be repeatedly configured within one discovery period.

FIG. 9 illustrates an example in which a discovery resource pool is allocated with a discovery period of 10 sec and 64 contiguous subframes are allocated in each discovery resource pool. However, the sizes of a discovery period and time/frequency resource of a discovery resource pool correspond to example, and the present invention is not limited thereto.

A UE autonomously selects a resource (i.e., "discovery resource") for transmitting its own discovery message within a dedicatedly allocated discovery pool, and transmits a discovery message through the selected resource.

Sidelink Communication

The application area of sidelink communication also includes network edge-of-coverage in addition to in and out of network coverage (in-coverage, out-of-coverage). Sidelink communication may be used for purposes, such as public safety (PS).

If a UE 1 has the role of direct communication data transmission, the UE 1 transmits direct communication data, and a UE 2 receives direct communication data. The transmission and reception roles of the UE 1 and the UE 2 may be changed. Direct communication transmission from the UE 1 may be received by one or more UE(s), such as the UE 2.

Sidelink discovery and sidelink communication are not associated, but may be independently defined. That is, in groupcast and broadcast direct communication, sidelink discovery is not necessary. As described above, if sidelink discovery and sidelink direct communication are independently defined, UEs do not need to recognize an adjacent UE. In other words, in the case of groupcast and broadcast direct communication, all receiver UEs within a group do not need to be adjacent to each other.

A physical sidelink shared channel (PSSCH) may be defined as a channel in which sidelink communication data is transmitted. Furthermore, a physical sidelink control channel (PSCCH) may be defined as a channel in which control information for sidelink communication (e.g., scheduling assignment (SA) for sidelink communication data transmission, transmission format) is transmitted. A PSSCH and a PSCCH may reuse a PUSCH structure.

Two modes (Mode 1, Mode 2) may be used as a resource allocation method for sidelink communication.

Mode 1 refers to a method of an eNB to schedule resources, used to transmit data or control information for sidelink communication, with respect to a UE. In in-coverage, Mode 1 is applied.

An eNB configures a resource pool for sidelink communication. The eNB may deliver information on a resource pool for sidelink communication to the UE through higher layer signaling. In this case, the resource pool for sidelink communication may be divided into a control information pool (i.e., resource pool for transmitting a PSCCH) and a sidelink data pool (i.e., resource pool for transmitting a PSSCH).

When a transmitter UE requests a resource for transmitting control information and/or data from an eNB, the eNB schedules a control information and sidelink data transmission resource within a pool configured in the transmitter D2D UE using a PDCCH or ePDCCH. Accordingly, the transmitter UE transmits control information and sidelink data to a receiver UE using the scheduled (i.e., allocated) resource.

Specifically, the eNB may perform scheduling on a resource for transmitting control information (i.e., resource for transmitting a PSCCH) using a downlink control information (DCI) format 5 or a DCI format 5A, and may perform scheduling on a resource for transmitting sidelink data (i.e., resource for transmitting a PSSCH) using a sidelink control information (SCI) format 0 or an SCI format 1. In this case, the DCI format 5 includes some fields of the SCI format 0, and the DCI format 5A includes some fields of the SCI format 1.

In accordance with the above description, in the case of Mode 1, a transmitter UE needs to be in the RRC_CONNECTED state in order to perform sidelink communication. The transmitter UE transmits a scheduling request to an eNB. A buffer status report (BSR) procedure is performed so that an eNB can determine the amount of resources requested by the transmitter UE.

When receiver UEs monitor a control information pool and decode control information related thereto, they may selectively decode sidelink data transmission related to the corresponding control information. The receiver UE may not decode a sidelink data pool based on a result of the decoding of control information.

A detailed example and signaling procedure of the sidelink communication mode 1 are shown in FIGS. 10 and 11. In this case, as described above, control information related to sidelink communication is transmitted through a PSCCH, and data information related to sidelink communication is transmitted through a PSSCH.

FIG. 10 illustrates a method of performing a sidelink operational procedure in a sidelink communication mode 1 based on control of an eNB and sidelink communication by transmitting and receiving related information.

As shown in FIG. 10, a PSCCH resource pool 1010 and/or a PSSCH resource pool 1020 related to sidelink communication may be pre-configured. The pre-configured resource pool may be transmitted from an eNB to sidelink UEs through higher layer signaling (e.g., RRC signaling). In this case, the PSCCH resource pool and/or the PSSCH resource pool may mean a resource (i.e., dedicated resource) reserved for sidelink communication. In this case, the PSCCH is control information for scheduling the transmission of sidelink data (i.e., PSSCH), and may mean a channel in which the SCI format 0 is transmitted.

Furthermore, the PSCCH is transmitted according to a PSCCH period, and the PSSCH is transmitted according to a PSSCH period. The scheduling of the PSCCH is performed through the DCI format 5 (or DCI format 5A), and the scheduling of the PSSCH is performed through the SCI format 0 (or SCI format 1). The DCI format 5 may be referred to as a sidelink grant, and may be transmitted through a physical layer channel or MAC layer channel, such as a PDCCH or an EPDCCH.

In this case, the DCI format 5 includes resource information for a PSCCH (i.e., resource allocation information), a transmission power control (TPC) command for a PSCCH and PSSCH, a zero padding (ZP) bit(s) and some fields of the SCI format 0 (e.g., frequency hopping flag, resource block assignment and hopping resource allocation information, a time resource pattern (e.g., subframe pattern)).

Furthermore, the fields of the SCI format 0 is information related to the scheduling of a PSSCH, and includes fields, such as a frequency hopping flag, a time resource pattern, a modulation and coding scheme (MCS), a TA indication, and a group destination ID.

FIG. 11 illustrates a downlink control information transmission method for sidelink communication between UEs in a wireless communication system supporting sidelink communication. FIG. 11 is merely for convenience of description and does not limit the scope of the present invention.

Referring to FIG. 11, it is assumed that the DCI format 5 is used as a sidelink grant. If the DCI format 5A is used, in FIG. 11, the DCI format 5 is substituted with a DCI format 5A and the SCI format 0 may be substituted with the SCI format 1.

First, in step S1105, a PSCCH resource pool and/or a PSSCH resource pool related to a sidelink is configured by a higher layer.

Thereafter, in step S1110, an eNB transmits information on the PSCCH resource pool and/or the PSSCH resource pool to a sidelink UE through higher layer signaling (e.g., RRC signaling).

Thereafter, in step S1115, the eNB transmits control information, related to the transmission of a PSCCH (i.e., SCI format 0) and/or the transmission of a PSSCH (i.e., sidelink communication data), to a sidelink transmitter UE through the DCI format 5 respectively or together. The control information includes information scheduling of the PSCCH and/or the PSSCH in the PSCCH resource pool and/or the PSSCH resource pool. For example, resource allocation information, an MCS level, a time resource pattern, etc. may be included in the control information.

Thereafter, in step S1120, the sidelink transmitter UE transmits the PSCCH (i.e., SCI format 0) and/or PSSCH (i.e., sidelink communication data) to a sidelink receiver UE based on the information received in step S1115. In this case, the transmission of the PSCCH and the transmission of the PSSCH may be performed together, or the transmission of the PSSCH may be performed after the transmission of the PSCCH.

Meanwhile, although not shown in FIG. 11, the sidelink transmitter UE may request a transmission resource (i.e., PSSCH resource) for sidelink data from the eNB, and the eNB may schedule resources for the transmission of the PSCCH and the PSSCH. To this end, the sidelink transmitter UE transmits a scheduling request (SR) to the eNB, and a buffer status report (BSR) procedure may be performed so that the eNB can determine the amount of resources requested by the sidelink transmitter UE.

Sidelink receiver UEs may monitor a control information pool. When control information related thereto is decoded, the sidelink receiver UEs may selectively decode sidelink data transmission related to the corresponding control information.

In contrast, Mode 2 refers to a method of a UE to randomly select a specific resource in a resource pool in order to transmit data or control information for sidelink communication. In out-of-coverage and/or in-coverage, Mode 2 is applied.

In Mode 2, a resource pool for control information transmission and/or a resource pool for sidelink communication data transmission may be pre-configured or may be semi-statically configured. A UE is provided with a configured resource pool (time and frequency) and selects a resource for sidelink communication transmission in a resource pool. That is, the UE may select a resource for control information transmission in a control information resource pool in order to transmit control information. Furthermore, the UE may select a resource in a data resource pool for the sidelink communication data transmission.

Furthermore, in sidelink broadcast communication, control information is transmitted by a broadcasting UE. The control information explicitly and/or implicitly indicates the location of a resource for data reception in relation to a physical channel (i.e., PSSCH) that carries sidelink communication data.

Sidelink Synchronization

A sidelink synchronization signal (sidelink synchronization sequence, sidelink SS) may be used for a UE to obtain time-frequency synchronization. In particular, in the case of out of coverage of a network, control of an eNB is impossible. A new signal and procedure for synchronization establishment between UEs may be defined.

A UE that periodically transmits a sidelink synchronization signal may be referred to as a sidelink synchronization source.

Each UE may have multiple physical-layer sidelink synchronization identities (IDs). The number of physical-layer sidelink synchronization IDs is 336 (i.e., 0 to 335). 336 physical-layer sidelink synchronization IDs may be divided into an in-network coverage part ID set (id_net set, 0 to 167) and an out-of-network coverage ID set (id_oon set, 168 to 335).

A sidelink synchronization signal includes a primary sidelink synchronization signal (PSSS) and a secondary sidelink synchronization signal (SSSS).

The PSSS is transmitted in two neighbor SC-FDMA symbols of the same subframe. In this case, in order to generate the PSSS, if physical-layer sidelink synchronization IDs are 0 to 167, a Zadoff-Chu sequence having a root index of 26 is used. In other cases, a Zadoff-Chu sequence having a root index of 37 is used.

In this case, a sequence configuring the PSSS is mapped to the resource elements of an antenna port 1020 in the first slot of a corresponding subframe according to Equation 1.

$$a_{k,l} = d_i(n), n = 0, \ldots, 61 \qquad [\text{Equation 1}]$$

$$k = n - 31 + \frac{N_{RB}^{SL} N_{sc}^{RB}}{2}$$

$$l = \begin{cases} 1, 2 & \text{normal cyclic prefix} \\ 0, 1 & \text{extended cyclic prefix} \end{cases}$$

Furthermore, the SSSS is transmitted in the two neighbor SC-FDMA symbols of the same subframe. In this case, in order to generate the SSSS, two sequences assuming a subframe 0, that is, $N_{ID}^{(1)} = N_{ID}^{SL} \mod 168$ and $N_{ID}^{(2)} = [N_{ID}^{SL}/168]$ for transmission modes 1 and 2, and a subframe 5 for transmission modes 3 and 4, respectively, are used.

In this case, a sequence configuring the SSSS is mapped to resource elements for the antenna port 1020 in the second slot of a corresponding subframe according to Equation 2.

$$a_{k,l} = d_i(n), n = 0, \ldots, 61 \qquad [\text{Equation 2}]$$

$$k = n - 31 + \frac{N_{RB}^{SL} N_{sc}^{RB}}{2}$$

$$l = \begin{cases} 4, 5 & \text{normal cyclic prefix} \\ 3, 4 & \text{extended cyclic prefix} \end{cases}$$

Before transmitting a sidelink synchronization signal, a UE may discover a sidelink synchronization source. Furthermore, when the sidelink synchronization source is discovered, the UE may obtain time-frequency synchronization through the received sidelink synchronization signal from the discovered sidelink synchronization source. Furthermore, the corresponding UE may transmit a sidelink synchronization signal.

Furthermore, a channel for delivering system information used for communication between UEs and synchronization-related information along with synchronization may be necessary. The channel may be referred to as a physical sidelink broadcast channel (PSBCH).

Vehicle-to-Everything (V2X)

(1) Vehicle-to-Everything (V2X) Sidelink Communication

V2X sidelink communication includes communication between a vehicle and all entities, such as vehicle-to-vehicle (V2V) referring to communication between vehicles, vehicle to infrastructure (V2I) referring communication between a vehicle and an eNB or a road side unit (RSU), and vehicle-to-pedestrian (V2P) referring to communication between a vehicle and UEs owned by persons (pedestrian, bicycler, vehicle driver or passenger).

In this case, a wireless communication system supporting V2X sidelink communication may include specific network entities for supporting communication between a vehicle and all entities. For example, the network entity may be an eNB, road side unit (RSU), a UE or an application server (e.g., traffic safety server).

Furthermore, a UE performing V2X sidelink communication may mean a vehicle UE (V-UE), a pedestrian UE, an RSU of an eNB type or an RSU of a UE type in addition to a common handheld UE.

V2X sidelink communication may be directly performed between UEs or may be performed through a network entity(s). V2X operation modes may be classified according to a method of performing V2X sidelink communication.

Terms used in V2X are defined as follows.

A road side unit (RSU): a road side unit (RSU) is a V2X service-capable apparatus capable of transmission and reception to and from a moving vehicle using V2I service.

Furthermore, the RSU is a fixed infrastructure entity supporting a V2X application program and may exchange messages with other entities supporting a V2X application program.

Pseudonymity: a condition in which data is not provided to a specific subscriber without using additional information in the processing of personally identifiable information (PII). A technological and organization measures for separately maintaining such additional information and guaranteeing non-attribution for a subscriber that has been identified or that may be identified.

The RSU is a term frequently used in the existing ITS spec. The reason why the term is introduced into 3GPP spec. is for enabling the document to be read more easily in the ITS industry.

The RSU is a logical entity that combines V2X application logic with the function of an eNB (called eNB-type RSU) or a UE (called UE-type RSU).

V2I Service: type of V2X service and an entity having one side belonging to a vehicle and the other side belonging to infrastructure.

V2P Service: V2X service type in which one side is a vehicle and the other side is a device carried by a person (e.g., a portable device carried by a pedestrian, bicycler, driver or follow passenger).

V2X Service: 3GPP communication service type in which a transmission or reception device is related to a vehicle.

V2V service, V2I service and V2P service may be further classified depending on a counterpart who participates in communication.

V2X enabled UE: UE supporting V2X service.

V2V Service: type of V2X service in which both sides of communication are vehicles.

V2V communication range: a direct communication range between two vehicles participating in V2V service.

V2X application program support type

A V2X application called vehicle-to-everything (V2X), as described above, includes the four types of (1) vehicle-to-vehicle (V2V), (2) vehicle-to-infrastructure (V2I), (3) vehicle-to-network (V2N) and (4) vehicle-to-pedestrian (V2P).

FIG. 12 illustrates the type of V2X application to which the present invention may be applied.

The four types of a V2X application may use "cooperative awareness" providing more intelligent service for the final user.

This means that entities, such as a vehicle, roadside infrastructure, an application server and a pedestrian, can collect knowledge of a corresponding area environment (e.g., information received from other adjacent vehicle or sensor device) so that the entities can process and share the corresponding knowledge in order to provide more intelligent information, such as a cooperative collision warning or autonomous driving.

Furthermore, the V2V applications expect adjacent UEs to exchange V2V application information. The 3GPP transmission of a message including V2V application information requires a UE to obtain valid subscription and permission from a network operator.

Transmission for a valid subscriber is provided regardless of whether a UE is served by an E-UTRAN. A UE supporting the V2V application transmits a message including 2V application information (e.g., location, dynamic and attributes). Message payload may be flexible in order to accommodate the amount of various types of information.

The 3GPP transmission of a message including V2V application information is chiefly based on broadcast as shown in FIG. 13. Such 3GPP transmission includes direct transmission between UEs due to a restricted direct communication range and/or transmission between UEs through a base structure supporting V2X communication, such as RSX and application server.

FIG. 13 illustrates broadcast-based V2V communication to which the present invention may be applied.

Vehicular to Vehicular (V2V)

An E-UTRAN enables adjacent UEs to exchange V2V-related information using the E-UTRAN when a permission, grant and proximity criterion is satisfied. A proximity criterion may be configured to a worker.

Furthermore, a UE supporting the V2V application broadcasts application layer information (e.g., as part of V2V service, regarding a corresponding location, dynamic and attributes). V2V payload needs to be flexible in order to accommodate different information contents. The information may be periodically broadcasted based on a configuration provided by an operator.

Vehicle-to-Infrastructure (V2I) Application

A UE supporting the V2I application transmits a message, including V2I application information, to an RSU or a local-related application server. The RSU and/or local-related application server transmits a message, including V2I application information, to one or more UEs supporting the V2I application.

A locally related application program server provides services to a specific geographical area. The same or different application programs may be provided because there are several application program servers providing service to an overlap area.

Vehicle-to-Network (V2N) Application

A UE supporting the V2N application communicates with an application server supporting the V2N application. Both communicate with each other through an EPS.

Vehicle-to-Pedestrian (V2P) Application

The V2P applications expect adjacent UEs to exchange V2P application information. The 3GPP transmission of a message including V2P application information requires a UE to obtain valid subscription and permission from a network operator. Transmission for a valid subscriber is provided regardless of whether a UE is served by an E-UTRAN.

A UE supporting a V2P application transmits a message including V2P application information. The V2P application information is expected to be transmitted by a UE supporting the V2X application in a vehicle (warning against a pedestrian) or a UE supporting a V2X application related a vulnerable road user (e.g., warning against a vehicle).

The 3GPP transmission of a message including V2P application information includes direct transmission between UEs due to a restricted direct communication range and/or transmission between UEs through an infrastructure structure supporting V2X communication, such as an RSX or application server.

A major difference between the 3GPP transmission of a message including V2P application information and the 3GPP transmission of a message including V2V application information lies in the characteristics of a UE. A UE supporting a V2P application used by a pedestrian may have a lower battery capacity, for example, and may have limited radio sensitivity due to the antenna design. Accordingly, the UE cannot transmit a message having the same periodicity as a UE supporting the V2V application and/or also cannot receive a message.

Relative Priority of V2X Communication

Specific business core services (e.g., public safety, MPS) may be relatively given priority over the transmission of V2X application program information according to local/country regulation requirements and an operator policy. The transmission of safety-related V2X application information may have priority over the transmission of V2X application program information not related to safety.

However, in general, an operator may control relative priority of different services.

Sidelink Communication-Related Identity (ID)

A sidelink communication and V2X sidelink communication-related ID to which the present invention may be applied is described.

The following IDs are used for sidelink communication.

Source Layer-2 ID: identify the sender of data in sidelink communication. Source Layer-2 ID is a 24-bit length and is used with a Destination Layer-2 ID and LCID in order to identify an RLC UM entity and PDCP entity on the receiver side.

Destination Layer-2 ID: identify the target of data in sidelink communication and V2X sidelink communication. In the case of sidelink communication, the destination layer-2 ID is a 24-bit length and is split into two bit streams in the MAC layer.

One bit string is the LSB part (8 bits) of a target layer 2 ID and delivered to a physical layer as a group target ID. This is used to identify the target of intended data in sidelink control information and to filter a packet in the physical layer.

The second bit text string is the MSB part (16 bits) of a target layer 2 ID and delivered within a MAC header. This is used to filter a packet in the MAC layer.

In the case of V2X sidelink communication, a Destination Layer-2 ID is not split and carried within a MAC header.

No Access Stratum signaling is necessary to form a group and to configure the Source Layer-2 ID, Destination Layer-2 ID and Group Destination ID of a UE.

Such an ID is provided by a higher layer and derived from an ID provided by a higher layer. In the case of group cast and broadcast, a ProSe UE ID provided by a higher layer is directly used as a Source layer-2 ID, and a ProSe Layer 2 group ID provided by a higher layer is directly used as a Destination layer-2 ID in the MAC layer.

In the case of one-to-one communication, a ProSe UE ID and V2X sidelink communication provided by a higher layer are directly used as a Source layer-2 ID or Destination layer-2 ID in the MAC layer.

V2X sidelink communication is described more specifically.

The support of V2X service through the PC5 interface is provided by V2X sidelink communication, that is, a communication mode in which a UE can perform direct communication through the PC5 interface. The communication mode is supported when a UE is served by an E-UTRAN and when a UE is out-of-E-UTRA coverage.

Only a UE permitted to be used in V2X service may perform V2X sidelink communication. Furthermore, in the case of V2X sidelink communication:

A sidelink transport channel (STCH) for sidelink communication is also used for V2X sidelink communication.

V2X data transmitted in a resource configured for V2X sidelink communication is not multi-transmitted along with non-V2X (e.g., public safety) data.

For sidelink communication, a control plane protocol stack for an SBCCH is also used for V2X sidelink communication as shown in FIG. 5b.

A UE supporting V2X sidelink communication may operate in the two modes for resource allocation:

Reserved resource allocation.

A UE needs to be in RRC_CONNECTED in order to transmit data.

A UE requests a transmission resource from an eNB. The eNB schedules a transmission resource for the transmission of sidelink control information and data.

UE autonomous resource selection.

A UE autonomously selects a resource in a resource pool and performs transmission format selection for transmitting sidelink control information and data.

When mapping between a zone and a V2X sidelink transmission resource pool is configured, a UE selects a V2X sidelink resource pool based on the zone where the UE is located.

A UE performs sensing for the (re)selection of sidelink resources. Based on the results of the sensing, the UE (re)selects some specific sidelink resources and reserves a plurality of sidelink resources.

A maximum of two parallel independent resource reservation processes are permitted to be performed by a UE. The UE is also permitted to perform single resource selection for V2X sidelink transmission.

A geographical area may be configured by an eNB or may be pre-configured. When the area is configured, the world is divided into geographical areas using a single fixing reference point (i.e., geographical coordinates (0, 0)), length and width).

A UE determines a zone identity based on the length and width of each zone, the number of zones in the length, and the number of zones in the width, and modulo operation using single fixing reference point.

The length and width of each zone, the number of zones in the length, and the number of zones in the width are provided by an eNB when a UE is in coverage and is pre-configured when the UE is out of coverage.

This area may be configured both in a service area and service area.

When a UE uses UE-autonomous resource selection with respect to the UE in coverage, an eNB may provide mapping between the V2X sidelink transmission resource pools between a zone(s) and an SIB21.

With respect to UEs out of coverage, mapping between a zone(s) and V2X sidelink transmission resource pools may be pre-configured.

If mapping between a zone(s) and a V2X sidelink transmission resource pool is (pre)configured, a UE selects a transmission sidelink resource in a resource pool corresponding to a zone where the UE is located.

The zone concept is not applied to a reception pool in addition to an exceptional V2X sidelink transmission pool.

A resource pool for V2X sidelink communication is not configured based on priority.

For V2X sidelink transmission, during handover, a transmission resource pool configuration including an exceptional transmission resource pool for a target cell may be signaled in a handover command in order to reduce a transmission stop.

Accordingly, a UE may use the transmission sidelink resource pools of the target cell before handover is completed as long as synchronization with the target cell is performed.

If an exceptional transmission resource pool is included in a handover command, the UE randomly starts to use a selected resource in the exceptional transmission resource pool starting from the reception of the handover command.

When resource allocation scheduled in the handover command is configured in the UE, the UE continues to use the exceptional transmission resource pool while a timer related to handover is executed. When autonomous resource selection is configured in the UE in a target cell, the UE continues to use the exceptional transmission resource pool until initial sensing is completed in a transmission resource pool for autonomous resource selection.

In an exceptional case (e.g., in a radio link failure (RLF), during transition from RRC IDLE to RRC CONNECTED or during a change in the dedicated sidelink resource pool of a cell), a UE may select resources in an exceptional pool provided by the SIB 21 of a serving cell based on sensing and may temporarily use them.

In obtaining a reception pool broadcasted by a target cell, in order to avoid a stop time when a V2X message is received due to latency, a synchronization configuration and reception resource pool configuration for the target cell may be signaled in a handover command with respect to RRC_CONNECTED UEs.

In the case of an RRC_IDLE UE, to minimize a sidelink transmission/reception stop time related to the acquisition of the SIB21 of a target cell depends on a UE implementation.

When a UE detects a cell on a corresponding carrier based on a criterion, the carrier is considered to be in-coverage in a carrier used for V2X sidelink communication.

If a UE permitted for V2X sidelink communication is in coverage for V2X sidelink communication, it may use resource allocation scheduled based on an eNB configuration or UE autonomous resource selection.

When a UE is out of coverage for V2X sidelink communication, a transmission and reception resource pool set for data is pre-configured in the UE. A V2X sidelink communication resource is not shared with another non-V2X application program transmitted through a sidelink.

If an RRC_CONNECTED UE is interested in V2X communication transmission in order to request a sidelink resource, it may transmit a sidelink UE information message to a serving cell.

In order to receive V2X communication, when a UE is configured by a higher layer and provided with a PC5 resource, the UE receives a configured resource.

A serving cell may provide a synchronization configuration for a carrier used for V2X sidelink communication. In this case, a UE follows a synchronization configuration received from a serving cell.

If a cell is not detected on the carrier used for V2X sidelink communication and the UE does not receive the synchronization configuration from the serving cell, the UE follows a pre-configured synchronization configuration. A synchronization criterion includes three types of an eNB, a UE and a GNSS. If the GNSS is configured as a synchronization source, the UE uses UTC time in order to calculate a direct frame number and subframe number.

If eNB timing is set as a synchronization criterion for a UE for a dedicated carrier for V2X, the UE follows a PCell (RRC_CONNECTED)/serving cell (RRC_IDLE) for synchronization and DL measurement.

PC5 Interface-Based V2X Operation Mode

FIG. 14 illustrates examples of a V2X operation mode based on a PC5 interface only.

Referring to FIG. 14, a UE transmits a V2X message to a plurality of UEs in the area where a sidelink is supported. In this case, the V2X message means a message mutually transmitted by a network entity or UE using a V2X sidelink communication system.

FIG. 14(a) means a V2V operation mode, FIG. 14(b) means a V2I operation mode, and FIG. 14(c) means a V2P operation mode. In this case, in the case of V2I, one of a transmitter UE or a receiver UE is an RSU of a UE type. Furthermore, in the case of V2P, one of a transmitter UE or a receiver UE is a pedestrian UE.

Uu Interface-Based V2X Operation Mode

FIG. 15 illustrates examples of a V2X operation mode based on a Uu interface only.

Referring to FIG. 15, FIG. 15(a) means a V2V operation mode, FIG. 15(b) means a V2I operation mode, FIG. 15(c) means a V2P operation mode, and FIG. 15(d) means a V2N operation mode.

In this case, there is a mode in which a UE(s) transmits (uplink transmission) a message (e.g., V2X message, V2I message) to a specific network entity (e.g., eNB, E-UTRAN) and a specific network entity transmits (downlink transmission) a message (e.g., V2X message, I2V message) to a plurality of UEs located in a specific area.

In this case, the specific network entity may be an eNB, an E-UTRAN or an RSU of an eNB type.

Furthermore, the UE may communicate with an application server.

Furthermore, in order to support a Uu interface-based V2X operation mode, an E-UTRAN performs the uplink reception and downlink transmission of V2X messages. For the downlink, the E-UTRAN may use a broadcast mechanism.

Uu Interface and PC5 Interface-Based V2X Operation Mode

FIG. 16 illustrates examples of a V2X operation mode based on both the Uu interface and the PC5 interface.

Referring to FIG. 16, FIG. 16(a) means a scenario 3A mode in which an E-UTRAN receives a V2X message from a UE type RSU and transmits the received V2X message to a plurality of UEs. In contrast, FIG. 16(b) means a scenario 3B mode in which a UE transmits a V2X message to an E-UTRAN, the E-UTRAN transmits the received V2X message to one or more UE type RSUs, and a UE type RSU transmits a V2X message to other UEs through a sidelink.

More specifically, if both the Uu interface and the PC5 interface are used, an RSU (e.g., an RSU of a UE type) is present between UEs and a specific network entity. The RSU may receive a message from the UEs or transmits a message to the UEs.

In this case, it is assumed that the RSU is connected to a specific network entity.

The specific network entity may receive a message from the UEs using the RSU or may transmit a message to the UEs. In this case, the specific network entity may be an eNB, an E-UTRAN or an RSU of an eNB type.

In this case, a specific network entity or RSU that receives the message of the UEs may operate through the Uu interface (e.g., Uu vehicle-to-infrastructure (V2I)) using a legacy LTE uplink method.

Alternatively, the specific network entity or the RSU may operate through the PC5 interface (e.g., PC5 V2I or PC5 V2V signal overhearing) using a separate resource or separate band supporting communication between UEs.

Likewise, the specific network entity or RSU transmitting a message to the UEs may operate through the Uu interface or the PC5 interface using a legacy LTE downlink method.

(2) Scheduling Scheme in V2V Sidelink Communication

In the case of V2V sidelink communication, an eNB indication-based scheduling method (i.e., Mode 1) of sidelink communication and a scheduling method (i.e., Mode 2) for a UE to autonomously select a resource within a specific resource pool may be used.

However, in V2V sidelink communication, Mode 3 corresponding to Mode 1 and Mode 4 corresponding to Mode 2 are defined so that they are different from those in the case of the existing sidelink communication.

In this case, Mode 3 may be referred to as a distributed scheduling method, and Mode 4 may be referred to as an eNB scheduling method.

In particular, sensing based on a semi-persistent transmission-based mechanism may be defined with respect to the distributed scheduling method (i.e., Mode 4). Most of V2V traffic from a UE is periodical. The V2V traffic is used to sense congestion for a resource and to estimate a future congestion for a corresponding resource. Corresponding resources are booked based on the estimation. The use of a channel can be optimized by improving separation efficiency between transmitters using an overlap resource through such a technology.

A configuration 1 for Mode 4 (i.e., distributed scheduling) and a configuration 2 for Mode 3 (i.e., eNB scheduling) may be represented like FIG. 17.

FIG. 17 illustrates examples of scheduling methods which may be applied to V2V sidelink communication.

Referring to FIG. 17, two configurations use a V2V communication dedicated carrier. That is, a band for the dedicated carrier is used for only PC5-based V2V communication. In this case, FIG. 17(a) illustrates a method for the configuration 1, and FIG. 17(b) illustrates a method for the configuration 2.

In this case, in both cases, time synchronization may be performed by a global navigation satellite system (GNSS).

FIG. 17(a), that is, in the case of the configuration 1, the scheduling and interference management of V2V traffic is supported based on a distributed algorithm (i.e., Mode 4) implemented between vehicles. As described above, the distributed algorithm is based on sensing through semi-persistent transmission. Furthermore, a mechanism in which resource allocation depends on geographical information is defined.

In contrast, FIG. 17(b), that is, in the case of the configuration 2, the scheduling and interference management of V2V traffic is supported by an eNB through control signaling through the Uu interface. The eNB allocates resources used for V2V signaling in a dynamic manner.

As described above, in order for UEs to perform direct communication through a sidelink, an eNB may select and indicate a resource through which a message will be transmitted, and may signal a related control message with respect to the UEs. As described above, the indicating and signaling method of an eNB may be referred to as a network-assisted method and/or a mode 1 method. In contrast, the method for a UE to select a direct resource may be referred to as a UE-autonomous method and/or a mode 2 method. Furthermore, in the case of V2X sidelink communication, unlike in the sidelink communication of a common UE, the mode 1 method may be referred to as a mode 3 method, and the mode 2 method may be referred to as a mode 4 method.

If UEs perform communication, the UE needs to transmit scheduling assignment (SA) for designating resource allocation information on transmission data upon sidelink resource selection and scheduling to another UE. Furthermore, in the case of the mode 1 method, an eNB transmits downlink control information (DCI) to designate information on SA and information on transmission data to a UE. In this case, the DCI may include information on the transmission of the SA and some of the contents of the SA (i.e., information related to the transmission of data). Furthermore, the DCI may be referred to as a sidelink grant, and the SA may be referred to as sidelink control information (SCI).

In this case, information on a pattern (e.g., time/frequency resource pattern) for transmitting the SA and/or data and/or a scheduling method may be added as a specific field of the DCI. In this case, the existing DCI format (i.e., DCI format designed to have the same size as the DCI format 0) may be partially changed. For example, if SA and/or data are retransmitted, when an eNB does not transmit DCI for each retransmission (or transmission) and transmits only DCI for initial transmission to a UE, the eNB needs to notify the UE of information on the remaining SA and/or data. In this case, the eNB may transmit only the DCI for initial transmission to the UE in order to reduce DCI overhead.

As described above, if the fields of the existing parameters are maintained without any change while taking into consideration the addition of a specific field(s) for DCI, the length (i.e., size) of the DCI is increased. In this case, since the size is different for each DCI format, there may be a problem in that the number and/or type of blind decoding performed in a UE are different. That is, if the size of a DCI format is not regularly configured for each format, overhead of the blind decoding of a UE may increase.

Accordingly, a method of maintaining the size of a DCI format (i.e., configured to be the same as the size of the DCI format 0) although new fields are added to DCI needs to be taken into consideration. In this case, a method of deleting or abbreviating some fields in the existing DCI and adding a new field may be taken into consideration.

In this case, a value indicated in a corresponding field (i.e., deleted or abbreviated field) may be indicated using different signaling or a different replaceable field with respect to a UE. In this case, the different replaceable field may mean a newly added field in addition to fields in the existing DCI.

Hereinafter, in this specification, a method of configuring a DCI format used for V2X sidelink communication is described in detail.

As described above, DCI defined in sidelink communication is information used to schedule SA (or SCI or PSCCH). SA is information used to schedule (sidelink) data (or PSSCH).

Furthermore, in the case of sidelink communication, a DCI format transmitted from an eNB to a transmitter terminal (e.g., transmitter UE) may be represented as a DCI format 5. SA transmitted from a transmitter UE to a receiver terminal (e.g., receiver UE) may be represented as an SCI format.

In particular, in the case of V2X sidelink communication, a DCI format transmitted from an eNB to a transmitter UE may be represented as a DCI format 5A. SA transmitted from a transmitter UE to a receiver UE may be represented as an SCI format 1. However, the present invention is not limited to the above expressions and may be represented in various forms. For example, a DCI format used for V2X sidelink communication may be represented as the DCI format 5, the DCI format 5A, a modified DCI format 5 or a new DCI format 5.

Furthermore, contents described in relation to the present invention may be extended and applied to other wireless communication that operates in the same manner in addition to V2X sidelink communication.

In this case, as described above, if additional information (i.e., additional field) not present in a conventional technology is included in the DCI format, methods for maintaining the length (i.e., size) of the DCI format as in a conventional technology are described in this specification.

Furthermore, the methods described in this specification may be applied as a method of reducing the size of a common DCI format in addition to maintaining the size of a DCI format used for V2X sidelink communication. Reducing the size of a DCI format itself may mean reducing the amount of resources (e.g., radio resources, power, transmission time) necessary for the transmission of DCI. Accordingly, when the size of a DCI format is reduced, an eNB may perform more efficient scheduling in terms of resource.

Furthermore, the following embodiments have been classified for convenience of description, some elements or characteristics of any embodiment may be included in another embodiment or may be substituted with corresponding elements or characteristics of another embodiment. For example, a method described in a second embodiment may be additionally applied to a method described in a first embodiment and vice versa.

First Embodiment—Method of Reducing the Size of a Field Related to SA and/or Resource of Data In order to maintain the size of DCI while adding a new field to the DCI, a method of reducing the size of an SA resource field included in the existing DCI (i.e., resource field for a physical sidelink control channel (PSCCH)) may be taken into consideration.

Compared to a conventional technology (e.g., sidelink communication between common UEs), the number of resources available for SA transmission in V2X communication or V2V communication is not changed or is slightly changed. In this case, there is a poor possibility that the size (e.g., 6 bits) of a field indicating the SA resource defined in the existing DCI format (e.g., DCI format 5/5A) will be changed by changing only a method of multiplexing SA and/or data (e.g., frequency division multiplexing (FDM) scheme, time division multiplexing (TDM) scheme).

However, if a UE can be aware of some or all of pieces of allocation information on the time/frequency resource of SA transmission and such information has been indicated by an eNB or can be autonomously estimated, the size of a field indicating an SA resource may be reduced. That is, a method of reducing the size of a field indicating the SA resource (i.e., configuring the size of a field indicating the SA resource to be less than 6 bits) using pre-defined information (i.e., previous information) or implicit information may be taken into consideration.

For example, if SA is configured to be transmitted after a specific timing offset (or time gap, subframe offset) from the transmission location of DCI, information on the time resource of SA transmission does not need to be included in DCI. For example, if DCI is transmitted in a subframe # n, SA may be configured to be transmitted in a subframe # n+k.

In this case, configuration information on the specific timing offset may be pre-defined (determined or configured) in a system or an eNB may notify a UE of the configuration information through signaling (e.g., higher layer signaling). For example, such a method may be performed like FIG. 18.

FIG. 18 illustrates an example of an SA transmission method according to an embodiment of the present invention. FIG. 18 is merely for convenience of description and does not restrict the range of the present invention.

Referring to FIG. 18, each illustrated square means a subframe. It is assumed that SA is transmitted in a fourth subframe after the transmission of DCI. Specifically, when DCI is transmitted in an n-th subframe 1802, SA may be configured to be transmitted in an (n+4)-th subframe 1804. Alternatively, unlike in the case of FIG. 18, SA may be configured to be transmitted in the first sidelink subframe present (or occurring) after the (n+4)-th subframe 1804.

As described above, if SA is configured to be transmitted after a specific timing offset (or time gap) from the transmission location of DCI, an eNB may indicate only frequency resource allocation information of the SA transmission through the DCI with respect to a UE. Furthermore, if SA transmission is configured to be performed at the location spaced apart from the transmission location of DCI at a specific timing offset and/or a specific frequency offset, an eNB may also transmit, to a UE, DCI not including time resource allocation information and/or frequency resource allocation information of the SA transmission. In other words, the size of a field indicating an SA resource can be reduced compared to the existing DCI because some resource allocation information can be excluded from DCI based on the time/frequency relation between DCI transmission and SA transmission.

Alternatively, if SA and data are multiplexed according to the FDM scheme and/or SA is transmitted in a subchannel unit configured as a specific number of resource blocks (RBs), the size of frequency resource allocation information of SA transmission may be reduced. That is, as frequency resources in which the transmission of SA and/or data may be performed are grouped, the size of frequency resource allocation information of SA transmission can be reduced.

Furthermore, the above-described method can reduce the size of a field indicating an SA resource and can be effectively applied to a case where V2X communication or V2V communication uses a band widely in the frequency (i.e., when a wide bandwidth is supported). Specifically, the uncertainty of SA detection can be reduced because a specific time/frequency offset between DCI transmission and SA transmission is used. Accordingly, effective SA scheduling can be performed in the FDM scheme.

Furthermore, in relation to resource information included in DCI, a method of the size of an SA resource field and RB assignment field may also be taken into consideration. The RB assignment field included in the existing DCI has been configured to distinguish between all cases of combinations between the instance at which RB allocation starts and the instance at which RB allocation is terminated (or the number of allocated RBs).

In this case, if a UE can estimate (or reason) the number of allocated RBs through signaling, indication or another field included in DCI from an eNB, the size of the RB assignment field can be reduced. Alternatively, if a UE can be aware of the starting point of RB allocation through the associative relation between the frequency allocation methods of SA and data, the size of the RB assignment field can be reduced. In this case, the size of RBs (i.e., RB size) may be pre-defined depending on the type of V2V or V2X message used for the transmission of data. Furthermore, if a resource allocation unit for data is transmitted in a subchannel unit configured as a specific number of RBs, the size (i.e., the number of bits) of the RB assignment field may be changed as the resource allocation unit is changed.

Second Embodiment—Method of Indicating a Modulation and Coding Scheme (MCS) Index In the case of the above-described mode 1 method, dynamic scheduling, semi-persistent scheduling (SPS) may also be taken into consideration for data transmission between UEs. In this case, common (or single) DCI (or DCI format) capable of being applied to both the two (or or more) scheduling methods may be configured. Separate DCI may be configured with respect to each scheduling method, but common DCI may be used in the scheduling methods in order to reduce the complexity of DCI (i.e., in order to reduce the number and/or type of blind decoding of a UE). The common DCI may be referred to as a mode 1 sidelink DCI or a mode 1 sidelink grant.

In this case, in the case of the dynamic scheduling method, information of specific DCI is used for the transmission of one or associated data (or with respect to a specific transmission section). In contrast, in the case of the SPS method, information of specific DCI may be used until a corresponding SPS transmission operation is released. Accordingly, in order to use the common DCI for the two scheduling methods, a field indicating the valid period of corresponding DCI may be additionally included. In this case, the field indicating the valid period of corresponding DCI may mean a field to indicate how long is corresponding DCI valid. For example, the field indicating the valid period of corresponding DCI may include a field to distinguish between dynamic scheduling and SPS.

If dynamic transmission and SPS transmission are divided through the field, a specific field may be configured to be suitable for the use of each of dynamic transmission and SPS transmission. In this case, a UE may interpret (or use) a corresponding specific field for the use of each of dynamic transmission and SPS transmission. Alternatively, some or all of fields except the field to distinguish between dynamic scheduling and SPS may be differently configured (defined or configured) with respect to dynamic transmission and SPS transmission.

For example, when the field to distinguish between dynamic scheduling and SPS is configured as 1 bit, 0 may indicate that corresponding DCI is for dynamic scheduling. That is, 0 may indicate DCI defined with respect to only one-shot transmission or associated transmissions (or retransmission). In contrast, 1 may indicate that corresponding DCI is for SPS. Accordingly, if a UE receives DCI having the field configured as 1, the corresponding UE may operate based on SPS transmission. That is, the UE may transmit SA and/or data, indicated by corresponding DCI, during the existing configured specific period and/or a specific period indicated by signaling (e.g., RRC signaling) or until a corresponding SPS transmission operation is released.

In relation to the specific period, a UE may count the number of times that SA and/or data is transmitted and perform the transmission of SA and/or data until a corresponding timer expires. Alternatively, the UE may count the time elapsed from the instance at which DCI is transmitted and perform the transmission of SA and/or data until a corresponding timer expires.

As described above, if dynamic transmission and SPS transmission are scheduled using the common DCI (i.e., the same DCI format), various type of messages can be transmitted in terms of the size of a message and the size of a transport block. Accordingly, an eNB needs to indicate a modulation and coding scheme (MCS), applied to the various type of messages, with respect to a UE.

In this case, the eNB may semi-statically indicate an MCS index with respect to the UE through higher layer signaling (e.g., RRC signaling).

Alternatively, the MCS index is included in the existing SA (i.e., SCI format), but a method of including a field indicating information on the MCS in DCI so that a UE can recognize an MCS level although it does not receive SA may also be taken into consideration. In particular, if the field indicating information on the MCS is included in DCI, a UE performing SPS transmission can recognize a change in the MCS through the DCI although it does not receive SA.

For example, as in the DCI format 0, a field indicating an MCS (i.e., MCS index) or an MCS and redundancy version may be included in DCI used for sidelink (or V2X, V2V) communication. In this case, the corresponding field may be configured as 5 bits by taking into consideration an available MCS level.

For another example, in the case of sidelink (or V2X, V2V) communication, a method of reducing the size of a field indicating the MCS index (i.e., configured the size of a field indicating the MCS index to be less than 5 bits) using a characteristic in which the type of transmittable message is limited may also be used. If a field having a reduced size is used, an eNB may indicate an MCS index for the transmission of a message related to corresponding DCI with respect to a UE using only extra bits generated due to the reduced size of other fields included in DCI. That is, if the method is used, there is an advantage in that the size of the existing DCI can be maintained although extra bits are configured to be small with respect to DCI.

Specifically, an eNB may transmit, to an eNB, DCI including a separate field indicating an MCS index. In other words, a separate field indicating a specific message among messages categorized based on an MCS index and the size of a message may be included in the DCI. In this case, the specific message may mean a specific message set selected from a plurality of pre-configured message sets.

In the case of dynamic scheduling transmission, various types of messages may be transmitted compared to SPS transmission. However, such V2V and/or V2X message transmission is chiefly used in a broadcast manner not transmission to a specific UE. Accordingly, the type of message transmitted in V2V and/or V2X communication (or sidelink communication) may be limited. Accordingly, a method for an eNB to indicate only some MCSs corresponding to the limited type of message may be used. Furthermore, if an MCS satisfying a specific criterion is used based on the characteristic that the repetitive transmission of SPS transmission is performed, the transmission of a message can be smoothly performed. Accordingly, in the case of SPS transmission, the transmission of a message can be performed without a problem although a specific MCS of some MCSs suitable for SPS transmission not all MCSs is indicated.

As described above, in the case of V2V and/or V2X communication (or sidelink communication), only some of MCS indices available for message transmission may be selectively used. Furthermore, only some of all transport block (TB) sizes may be selectively used. Furthermore, if an MCS index used for the transmission of a message and the size of a transport block are determined, the size of a resource block (RB) to be used for the transmission of a message may also be determined. Alternatively, after the size of a resource block and the size of a transport block are determined, an MCS index may be determined, and the sequence of the size of a resource block, the size of a transport block and an MCS index determined may include any combination.

An MCS (i.e., MCS index), the size of a transport block (TB size) and the size of a resource block (RB size) necessary based on the type of message transmitted as described above may be pre-defined to form one set. That is, one or more message sets may be pre-defined (or configured or determined) based on an MCS, the size of a transport block and the size of a resource block necessary for the type of each message used for V2V and/or V2X communication. In this case, although a UE detects only a set of messages indicated by corresponding DCI, the UE can obtain information on an MCS level, the size of a transport block and the size of a resource block necessary for the transmission of a corresponding message.

Furthermore, if the coding rate (i.e., coderate) of a corresponding message is not sufficient or a corresponding message is important to the extent that it must be repeatedly transmitted, the corresponding message may be configured to be repeatedly transmitted. In this case, information a (maximum) retransmission number and a coding rate may be additionally included in the message set in addition to the MCS (i.e., MCS index), the size of a transport block and the size of a resource block.

For example, the message sets may be configured like Table 3.

the transmission of a corresponding message. "coderate" means the coding rate of a corresponding message.

In this case, if the four types of message sets (i.e., first message set (Message set 1), second message set (Message set 2), third message set (Message set 3) and fourth message set (Message set 4)) are configured like Table 3, a message set field including a combination of the size of a message, the repeated transmission number and the number of resource blocks may be configured as 2 bits. In this case, the message set field may mean a separate field indicating an MCS index included in DCI. In this case, if the message set field is configured as 2 bits, a first message set may be indicated by "00", a second message set may be indicated by "01", a third message set may be indicated by "10", and a fourth message set may be indicated by "11." That is, an MCS index used for the transmission of a corresponding message may be indicated using only 2 bits reduced by 3 bits compared to the existing 5 bits.

In this case, configuration information on the message set may be pre-defined in a system or an eNB may transmit, to a UE, configuration information on the message set through higher layer signaling. Furthermore, the configuration information on the message set may be configured as a combination between various parameters related to a corresponding message type in addition to the size of a message, the repeated transmission number and the number of resource blocks.

Furthermore, in various embodiments of the present invention, the retransmission number (e.g., N_rpt) of a message used for V2V and/or V2X communication may be indicated through a new field indicating the message set or a time-resource pattern (T-RPT) field of transmission included in the existing DCI (e.g., DCI format 5). Alternatively, if the new field and the T-RPT field are not used, the retransmission number may be indicated through higher layer signaling (e.g., RRC signaling). A separate field indicating the retransmission number may be added to DCI.

FIG. 19 illustrates an operational flowchart of transmitting and receiving data by a first user equipment in a wireless communication system supporting vehicle-to-everything (V2X) according to various embodiments of the present invention. FIG. 19 is merely for convenience of description and does not restrict the range of the present invention.

Referring to FIG. 19, it is assumed that in order to perform sidelink communication (i.e., communication between UEs) with a second user equipment, the first user equipment receives indication for resource selection and scheduling through downlink control information from an eNB.

TABLE 3

| Message Set | Message size | N_rpt | N_PRB | I_TBS | I_MCS | Q_m | Coderate |
|---|---|---|---|---|---|---|---|
| 1 | 190 bytes | 3 | 10 | 9 (1544 bits) | 9 | 2 | 0.268 |
| 2 | 300 bytes | 2 | 10 | 13 (2536 bits) | 14 | 4 | 0.330 |
| 3 | 800 bytes | 2 | 25 | 13 (6456 bits) | 14 | 4 | 0.336 |
| 4 | 1600 bytes | 2 | 50 | 13 (12960 bits) | 14 | 4 | 0.338 |
| ... | ... | ... | ... | ... | ... | ... | ... |

In Table 3, "Message size" means the size of a corresponding message. "N_rpt" means the repeated transmission number of a corresponding message. "N_PRB" means the number of resource blocks (i.e., size of a resource block) used for the transmission of a corresponding message. "I_TBS" means the index (size) of a transport block used for the transmission of a corresponding message. "I_MCS" means an MCS index used for the transmission of a corresponding message. "Q_m" means modulation order used for In step S1905, the first user equipment (UE) receives downlink control information (DCI), including resource allocation information related to control information for sidelink (e.g., SA) transmission, from the eNB. In this case, the corresponding resource allocation information may mean SA resource allocation information having a size adjusted in the first embodiment (i.e., the number of bits is configured to be small compared to SA resource allocation information included in the existing DCI).

After the first user equipment receives the DCI, in step S1910, the first user equipment may transmit sidelink control information and at least one data (i.e., data transmitted through a sidelink, sidelink data) to the second user equipment. In this case, the transmission of the at least one data may be performed after the transmission of control information for a sidelink or may be performed at the same time.

In this case, the transmission of the control information for the sidelink is performed in a second subframe located after a pre-configured offset from the first subframe in which the DCI is received. In this case, the pre-configured offset may mean a specific timing offset described in the first embodiment. That is, the pre-configured offset may be configured based on the relation between the reception location of DCI (or DCI transmission location from a viewpoint of an eNB) and the transmission of control information for a sidelink location. Furthermore, the second subframe may include a first sidelink subframe located after a pre-configured offset from the first subframe. That is, if the first subframe is a subframe # n, the second subframe may include a subframe # n+k (subframe # n+4) (e.g., (n+4)-th subframe) or the first sidelink subframe occurring after the subframe # n+k.

In this case, the resource allocation information included in the DCI may include resource allocation information having a size adjusted based on at least one of the pre-configured offset or transmission units on a frequency domain related to the transmission of control information for a sidelink (e.g., a subchannel unit configured as a pre-configured (i.e., given) number of RBs). For example, the resource allocation information included in the DCI may mean resource allocation information having a size adjusted (e.g., configured as the number of bits smaller than 6 bits) because time resource allocation information is excluded based on the pre-configured offset. In this case, the number of bits configuring a DCI format related to the DCI may be configured to be identical with the number of bits configuring another DCI format (e.g., DCI format 0). That is, the length of the DCI format may be configured to be identical with the length of the DCI format 0.

Furthermore, the DCI may further include specific information (i.e., a specific field) indicating an MCS index for the transmission of the at least one data. For example, a separate field indicating an MCS described in the second embodiment may be additionally included prior to the DCI.

In this case, the specific information may include information indicating a specific message set among pre-configured message sets. In this case, the pre-configured message sets may mean the message sets described in the second embodiment. In other words, the pre-configured message sets may be configured based on at least one of an MCS index, the number of transport blocks or the number of resource blocks related to the transmission of the at least one data. In this case, the specific information may be configured as the number of bits smaller than 5 bits. The number of bits configuring the DCI format related to the DCI may be configured to be identical with the number of bits configuring another DCI format (e.g., DCI format 0).

Furthermore, the DCI may further include information (e.g., a field indicating the valid period of corresponding DCI in the second embodiment) indicating whether the control information for a sidelink and the transmission of the at least one data are performed according to an SPS method.

According to the above-described methods, the size of DCI (e.g., mode 1 sidelink grant) used for V2V and/or V2X communication may be configured to be identical with the size of the existing another DCI (e.g., DCI format 0). Accordingly, although additional information for V2V and/or V2X communication is included in DCI, a UE may identically perform blind decoding performed on the existing DCI with respect to the DCI. That is, there are advantages in that although additional information for V2V and/or V2X communication is added to DCI, a UE does not need to perform additional blind decoding compared to a conventional technology and DCI overhead does not occur.

General Apparatus to which the Present Invention may be Applied

FIG. 20 illustrates a block diagram of a wireless communication apparatus to which methods proposed in this specification may be applied.

Referring to FIG. 20, the wireless communication system includes an eNB 2010 and multiple UEs 2020 located in the area of the eNB 2020.

The eNB 2010 includes a processor 2011, memory 2012 and a radio frequency (RF) unit 2013. The processor 2011 implements the functions, processes and/or methods proposed in FIGS. 1 to 19. The layers of a radio interface protocol may be implemented by the processor 2011. The memory 2012 is connected to the processor 2011 and stores various types of information for driving the processor 2011. The RF unit 2013 is connected to the processor 2011 and transmits and/or receives radio signals.

The UE 2020 includes a processor 2021, memory 2022 and an RF unit 2023.

The processor 2021 implements the functions, processes and/or methods proposed in FIGS. 1 to 19. The layers of a radio interface protocol may be implemented by the processor 2021. The memory 2022 is connected to the processor 2021 and stores various types of information for driving the processor 2021. The RF unit 2023 is connected to the processor 2021 and transmits and/or receives radio signals.

The memory 2012, 2022 may be positioned inside or outside the processor 2011, 2021 and may be connected to the processor 2011, 2021 by various well-known means. Furthermore, the eNB 2010 and/or the UE 2020 may have a single antenna or multiple antennas.

FIG. 21 illustrates a block diagram of a communication apparatus according to an embodiment of the present invention.

Specifically, FIG. 21 is a detailed diagram showing the UE of FIG. 20.

Referring to FIG. 21, the UE may include a processor (or digital signal processor (DSP) 2110, an RF module (or RF unit) 2135, a power management module 2105, an antenna 2140, a battery 2155, a display 2115, a keypad 2120, memory 2130, a subscriber identification module (SIM) card 2125 (this element is optional), a speaker 2145 and a microphone 2150. The UE may further include a single antenna or multiple antennas.

The processor 2110 implements the functions, processes and/or methods proposed in FIGS. 1 to 19. The layers of a radio interface protocol may be implemented by the processor 2110.

The memory 2130 is connected to the processor 2110 and stores information related to an operation of the processor 2110. The memory 2130 may be positioned inside or outside the processor 2110 and may be connected to the processor 2110 by various well-known means.

A user inputs command information, such as a telephone number, by pressing (or touching) a button of the keypad 2120 or through voice activation using the microphone 2150, for example. The processor 2110 receives such command information and performs processing so that a proper function, such as making a phone call to the telephone number, is performed. Operational data may be extracted from the SIM card 2125 or the memory 2130. Furthermore, the processor 2110 may recognize and display command information or driving information on the display 2115, for convenience sake.

The RF module 2135 is connected to the processor 2110 and transmits and/or receives RF signals. The processor 2110 delivers command information to the RF module so that the RF module transmits a radio signal that forms voice communication data, for example, in order to initiate communication. The RF module 2135 includes a receiver and a transmitter in order to receive and transmit radio signals. The antenna 2140 functions to transmit and receive radio signals. When a radio signal is received, the RF module delivers the radio signal so that it is processed by the processor 2110, and may convert the signal into a baseband. The processed signal may be converted into audible or readable information output through the speaker 2145.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The methods of transmitting and receiving data in a wireless communication system of the present invention have been illustrated as being applied to the 3GPP LTE/LTE-A system, but may also be applied to various wireless communication systems in addition to the 3GPP LTE/LTE-A system.

The invention claimed is:

1. A method of transmitting and receiving, by a first user equipment, data in a wireless communication system supporting vehicle-to-everything (V2X), the method comprising:
   receiving, from a base station, downlink control information (DCI) comprising (i) resource allocation information related to a transmission of control information for a sidelink and (ii) specific information representing a modulation and coding scheme (MCS) index for a transmission of at least one data,
   transmitting, to a second user equipment, the control information for the sidelink based on the resource allocation information, and
   transmitting the at least one data to the second user equipment,
   wherein the control information for the sidelink is transmitted in a second subframe positioned after a pre-configured offset from a first subframe in which the downlink control information has been received,
   wherein the specific information comprises information representing a specific message set among pre-configured message sets, and
   wherein the specific information is configured as a number of bits smaller than 5 bits.

2. The method of claim 1, wherein the resource allocation information comprises resource allocation information having a size adjusted based on at least one of transmission unit on a frequency domain related to the transmission of the control information for the sidelink or the pre-configured offset.

3. The method of claim 2, wherein the transmission unit on the frequency domain related to the transmission of the control information for the sidelink comprises a subchannel unit configured with a pre-configured number of resource blocks.

4. The method of claim 2, wherein a number of bits configuring a DCI format related to the downlink control information is configured to be identical with a number of bits configuring another DCI format.

5. The method of claim 2, wherein when the first subframe is a subframe # n, the second subframe comprises a subframe # n+k or a first sidelink subframe generated after the subframe # n+k.

6. The method of claim 1, wherein the pre-configured message sets are configured based on at least one of an MCS index related to the transmission of the at least one data, a number of transport blocks or a number of resource blocks.

7. The method of claim 6, wherein the number of bits configuring the DCI format related to the downlink control information is configured to be identical with a number of bits configuring another DCI format.

8. The method of claim 1, wherein the downlink control information further comprises information indicating whether the transmission of the control information for the sidelink and the at least one data is performed based on semi-persistent scheduling.

9. A first user equipment transmitting and receiving data in a wireless communication system supporting vehicle-to-everything (V2X), the first user equipment comprising:
   at least one transceiver for transmitting and receiving radio signals, and at least one processor functionally connected to the at least one transceiver, wherein the at least one processor is configured to:

receive, from a base station, downlink control information (DCI) comprising (i) resource allocation information related to a transmission of control information for a sidelink and (ii) specific information representing a modulation and coding scheme (MCS) index for a transmission of at least one data, transmit, to a second user equipment, the control information for the sidelink based on the resource allocation information, and transmit the at least one data to the second user equipment, and wherein the control information for the sidelink is transmitted in a second subframe positioned after a pre-configured offset from a first subframe in which the downlink control information has been received, wherein the specific information comprises information representing a specific message set among pre-configured message sets, and wherein the specific information is configured as a number of bits smaller than 5 bits.

* * * * *